United States Patent
Kim et al.

(10) Patent No.: US 12,539,362 B2
(45) Date of Patent: Feb. 3, 2026

(54) LIQUID MEDICINE INJECTION DEVICE, DRUG INJECTION DEVICE, AND METHOD FOR DETERMINING REMAINING AMOUNT OF DRUG THEREOF

(71) Applicant: IPV, Seoul (KR)

(72) Inventors: Seungha Kim, Goyang-si (KR); Kiung Kim, Incheon (KR); Wonkyung Bang, Seoul (KR); Seonhwan Kim, Seongnam-si (KR); Dae Jong Park, Seoul (KR); Jesse Jaejin Kim, Seongnam-si (KR)

(73) Assignee: IPV, Seoul (KR)

( * ) Notice: Subject to any disclaimer, the term of this patent is extended or adjusted under 35 U.S.C. 154(b) by 426 days.

(21) Appl. No.: 18/114,332

(22) Filed: Feb. 27, 2023

(65) Prior Publication Data

US 2023/0211081 A1    Jul. 6, 2023

Related U.S. Application Data

(63) Continuation of application No. PCT/KR2021/008620, filed on Jul. 7, 2021.

(30) Foreign Application Priority Data

Aug. 31, 2020   (KR) .................... 10-2020-0110675
Sep. 7, 2020    (KR) .................... 10-2020-0114108

(51) Int. Cl.
*A61M 5/168*   (2006.01)
*A61M 5/142*   (2006.01)
(Continued)

(52) U.S. Cl.
CPC ...... *A61M 5/1684* (2013.01); *A61M 5/14244* (2013.01); *A61M 5/145* (2013.01);
(Continued)

(58) Field of Classification Search
CPC ............ A61M 5/1684; A61M 5/14244; A61M 5/145; A61M 5/172; A61M 2202/0486;
(Continued)

(56) References Cited

U.S. PATENT DOCUMENTS

2011/0160650 A1   6/2011   Chong
2014/0088556 A1   3/2014   Makaveev
(Continued)

FOREIGN PATENT DOCUMENTS

CN   107106765 A   8/2017
JP   2011516196 A   5/2011
(Continued)

OTHER PUBLICATIONS

Korean Office Action for KR 10-2020-0110675 issued on Apr. 28, 2022.
(Continued)

*Primary Examiner* — Jason E Flick
(74) *Attorney, Agent, or Firm* — Dinsmore & Shohl LLP; Yongsok Choi, Esq.

(57) ABSTRACT

Provided is a medical liquid injection device including a base body, a needle assembly mounted on the base body, a reservoir fluidly connected to the needle assembly and having an inner space in which a medical liquid is stored, a plunger disposed inside the reservoir, and configured to move in a longitudinal direction of the reservoir according to an amount of the medical liquid stored in the reservoir, and a first sensor unit configured to measure the amount of the medical liquid stored in the reservoir according to the movement of the plunger.

7 Claims, 25 Drawing Sheets

(51) Int. Cl.
*A61M 5/145* (2006.01)
*A61M 5/158* (2006.01)
*A61M 5/172* (2006.01)

(52) U.S. Cl.
CPC ............ *A61M 5/158* (2013.01); *A61M 5/172* (2013.01); *A61M 2202/0486* (2013.01); *A61M 2205/3576* (2013.01)

(58) Field of Classification Search
CPC ...... A61M 2205/3576; A61M 5/14248; A61M 2205/33; A61M 2205/3379; A61M 5/1452; A61M 5/168
See application file for complete search history.

(56) References Cited

U.S. PATENT DOCUMENTS

2017/0128664 A1* 5/2017 Diianni ................. A61M 5/158
2020/0069873 A1* 3/2020 Pizzochero ....... A61M 5/14248

FOREIGN PATENT DOCUMENTS

| JP | 2020507375 A | 3/2020 |
| KR | 10-2006-0019263 A | 3/2006 |
| KR | 1020090115899 A | 11/2009 |
| KR | 1020140110496 A | 9/2014 |
| KR | 10-2018-0028232 A | 3/2018 |
| KR | 1020180032832 A | 4/2018 |
| KR | 1020180081146 A | 7/2018 |
| KR | 1020180098630 A | 9/2018 |
| KR | 1020190109482 A | 9/2019 |
| WO | 2016/132937 A | 8/2016 |

OTHER PUBLICATIONS

Korean Notice of Allowance for KR 10-2020-0110675 issued on Oct. 25, 2022.

* cited by examiner

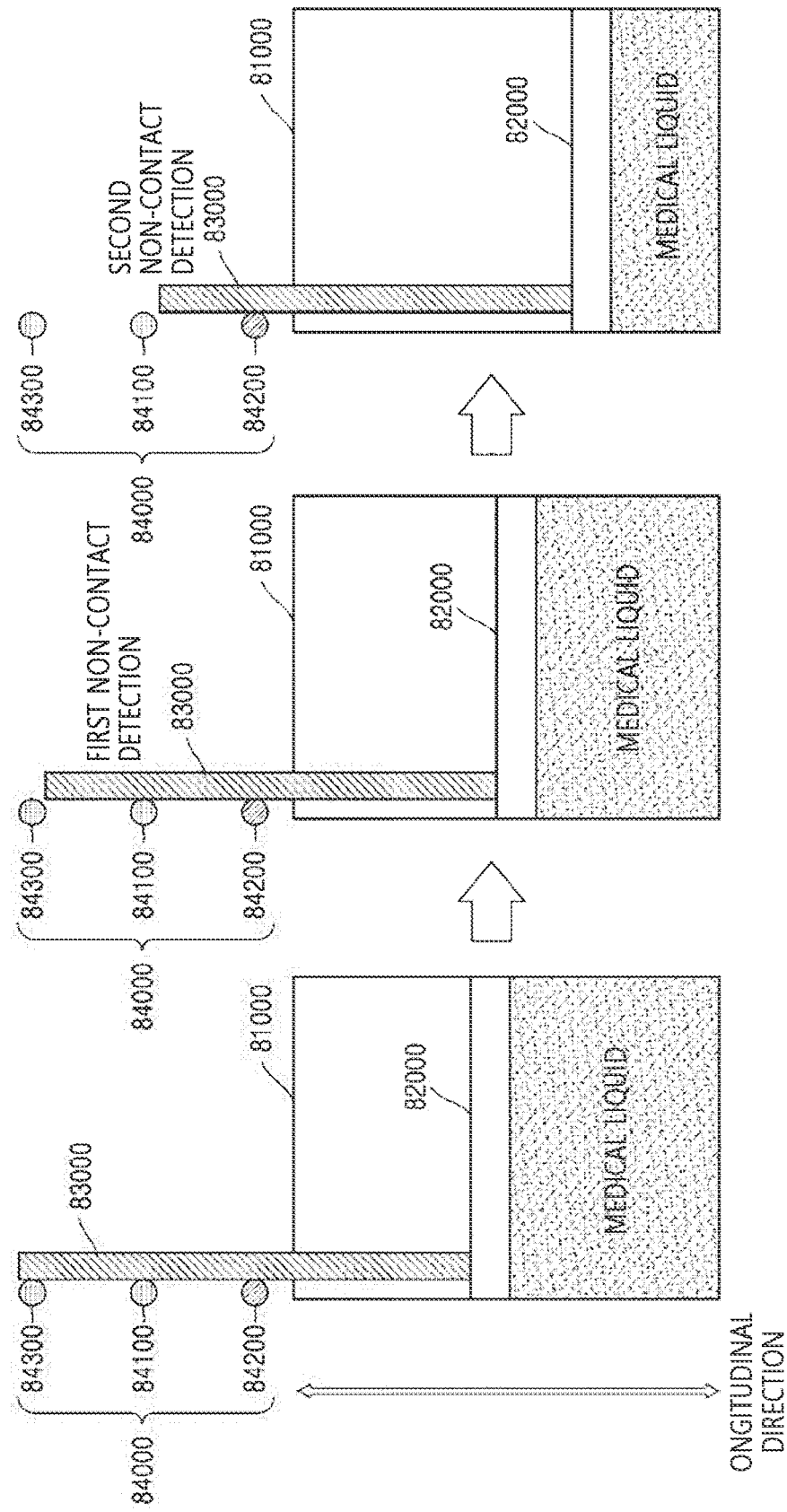

LIQUID MEDICINE INJECTION DEVICE, DRUG INJECTION DEVICE, AND METHOD FOR DETERMINING REMAINING AMOUNT OF DRUG THEREOF

CROSS-REFERENCE TO RELATED APPLICATIONS

This application is a continuation of PCT/KR2021/008620 filed on Jul. 7, 2021, which claims priority to Korean Patent Application No. 10-2020-0114108 filed on Sep. 7, 2020 and Korean Patent Application No. 10-2020-0110675 filed on Aug. 31, 2020, entire contents of which are herein incorporated by reference.

TECHNICAL FIELD

The present disclosure relates to a medical liquid injection device. The present disclosure provides a medical liquid injection device and a method of determining a medical liquid remaining amount thereof.

BACKGROUND ART

In general, medical liquid injection devices such as insulin injection devices are used to inject medical liquids into patients' bodies. Although the medical liquid injection devices are sometimes used by professional medical staff such as doctors or nurses, in most cases, the medical liquid injection devices are used by general public such as the patients themselves or guardians.

Diabetic patients, especially pediatric diabetic patients, need to inject medical liquids such as insulin into the body at regular intervals. Medical liquid injection devices in a form of patches that are attached to the human body for a certain period of time are being developed, and these medical liquid injection devices may be used in a state of being attached to the human body such as the patient's abdomen or waist for a certain period of time in the form of a patch.

In order to increase the effect of medical liquid injection, the medical liquid injection device needs to be controlled to precisely inject a medical liquid into the patient' body, and it is important to precisely inject a small amount of medical liquid through a small-sized medical liquid injection device.

The medical liquid injection device attached to the human body needs to be comfortable to wear, to be convenient to use, to be durable, and to be driven with low power. In particular, since a patient directly attaches the medical liquid injection device to the skin and uses it, it is important for a user to drive the medical liquid injection device conveniently and safely.

Diabetes is a metabolic disorder that generates a sign indicating that a blood sugar level exceeds a normal range because of insufficient insulin secretion or abnormal function. Diabetes is a complex disease that possibly affects individual tissues of the human body due to complications such as blindness, renal failure, heart failure, and neuropathy, and the like, and the number of diabetic patients is increasing every year.

In the case of diabetes, it is necessary to measure a blood sugar level using a blood sugar meter, and to manage the blood sugar level through appropriate means such as diet, exercise program, insulin injection, oral diabetes medication, and the like.

Recently, there is a need of technology for accurately identifying a medical liquid remaining amount of a medical liquid injection device and efficiently providing information on the medical liquid remaining amount to a user.

SUMMARY

Description of Embodiments

The present disclosure provides a medical liquid injection device capable of being safely driven and accurately delivering a medical liquid.

The present disclosure provides a medical liquid injection device and a method of determining a medical liquid remaining amount thereof. The technical problem to be achieved by the present embodiment is not limited to the above-described technical problems, and other technical problems can be deduced from the following embodiments.

Technical Solution to Problem

One aspect of the present disclosure provides a medical liquid injection device including a base body, a needle assembly mounted on the base body, a reservoir fluidly connected to the needle assembly and having an inner space in which a medical liquid is stored, a plunger disposed inside the reservoir, and configured to move in a longitudinal direction of the reservoir according to an amount of the medical liquid stored in the reservoir, and a first sensor unit configured to measure the amount of the medical liquid stored in the reservoir according to the movement of the plunger.

In addition, the plunger may include a connector member mounted on one side thereof and extending in one direction, and the first sensor unit may include a plurality of contact terminals disposed on a movement path of the connector member.

In addition, the connector member may be electrically connected to at least one of a pair of the contact terminals to sense a storage amount of the medical liquid set in advance.

In addition, the contact terminal may be disposed such that a center thereof is spaced apart from a center line of the connector member in a longitudinal direction and a surface thereof comes into contact with a surface of the connector member when the connector member linearly moves.

As a technical means to achieve the above-described technical object, according to an aspect of the present disclosure, a medical liquid injection device includes a storage unit in which a medical liquid is stored, a plunger configured to seal the storage unit, and move along a longitudinal direction of the storage unit as the medical liquid is replenished in or discharged from the sensor unit, a connector member attached to one side of the plunger, and a processor configured to receive a contact detection signal or a non-contact detection signal from the sensor unit, wherein the connector member is in contact or not in contact with the sensor unit disposed adjacent to the storage unit while moving together with the plunger.

In addition, the medical liquid injection device may be provided in which the processor switches the mode of the medical liquid injection device from a deactivation mode to an activation mode when receiving a contact detection signal from the sensor unit.

In addition, the medical liquid injection device may be provided in which the processor determines a remaining amount value of the storage unit as a preset remaining amount value when receiving a non-contact detection signal from the sensor unit.

In addition, the medical liquid injection device may be provided in which the sensor unit includes a plurality of contact terminals, and the processor differently determines the remaining amount value of the storage unit depending on the contact terminal, for which the non-contact detection signal is received from the sensor unit, among the plurality of contact terminals.

In addition, the medical liquid injection device may be provided in which the processor counts the non-contact detection signal received for a predetermined period of time after initially receiving the non-contact detection signal from the sensor unit, and determines the remaining amount value of the storage unit as a preset remaining amount value when the count value is greater than or equal to a preset value.

In addition, the medical liquid injection device may be provided in which, after the non-contact detection signal is initially received from the sensor unit, the processor counts the number of receptions of the non-contact detection signal by receiving the non-contact detection signal each time the medical liquid is discharged from the storage unit, and when the count value is greater than or equal to the preset value, the remaining amount value of the storage unit is determined as the preset remaining amount value.

In addition, the medical liquid injection device may be provided in which the processor calculates the remaining amount value of the storage unit on the basis of a remaining amount value of the storage unit when the non-contact detection signal is initially received, a discharge amount when the medical liquid is discharged once, and a count value.

In addition, the medical liquid injection device may be provided in which, when receiving the contact detection signal from the sensor unit before the count value becomes greater than or equal to the preset value, the processor determines that noise has occurred and resets the count value.

Advantageous Effects of Disclosure

A medical liquid injection device according to an embodiment of the present disclosure can measure an injection amount of a medical liquid stored in a reservoir. The driving of the medical liquid injection device can be set by measuring an amount of the medical liquid stored in the reservoir by a first sensor unit.

A medical liquid injection device according to an embodiment of the present disclosure can be preheated when a reservoir is filled with a medical liquid to a certain extent, so that driving efficiency can be increased. When an amount of the medical liquid injected into the reservoir is sensed to be greater than or equal to a first reference amount by the first sensor unit, the medical liquid injection device can prepare to drive some components as in a first mode and inject the medical liquid immediately when the medical liquid injection device is attached to a user.

When a medical liquid stored in a reservoir falls below a predetermined range, this can be sensed by a medical liquid injection device according to an embodiment of the present disclosure and informed to a user. When a first sensor unit senses that an amount of the medical liquid stored in the reservoir is less than or equal to a second reference amount, the medical liquid injection device can drive a second sensor unit and/or an encoder unit to precisely count an amount of the medical liquid remaining in the reservoir and transmit information on the counted amount to the user. Of course, the scope of the present disclosure is not limited by these effects.

According to the problem solving means of the present disclosure described above, a medical liquid remaining amount can be accurately determined by preventing an information error that may be detected when a contact between a connector member and a sensor unit is generated or released due to noise in addition to a fluctuation in the medical liquid remaining amount.

According to one of the other problem solving means of the present disclosure, a remaining amount value of a storage unit can be more accurately determined by calculating the remaining amount value of the storage unit on the basis of a remaining amount value of the storage unit when a non-contact detection signal is initially received, a discharge amount when a medical liquid is discharged once, and a count value of the non-contact detection signal, in consideration of the situation in which the medical liquid is discharged in a process of counting the non-contact detection signal after the non-contact detection signal is initially received.

BRIEF DESCRIPTION OF DRAWINGS

FIGS. 22A and 22B are views for describing an example in which a sensor unit detects a non-contact of a connector member according to an embodiment.

DETAILED DESCRIPTION

Figure 1:
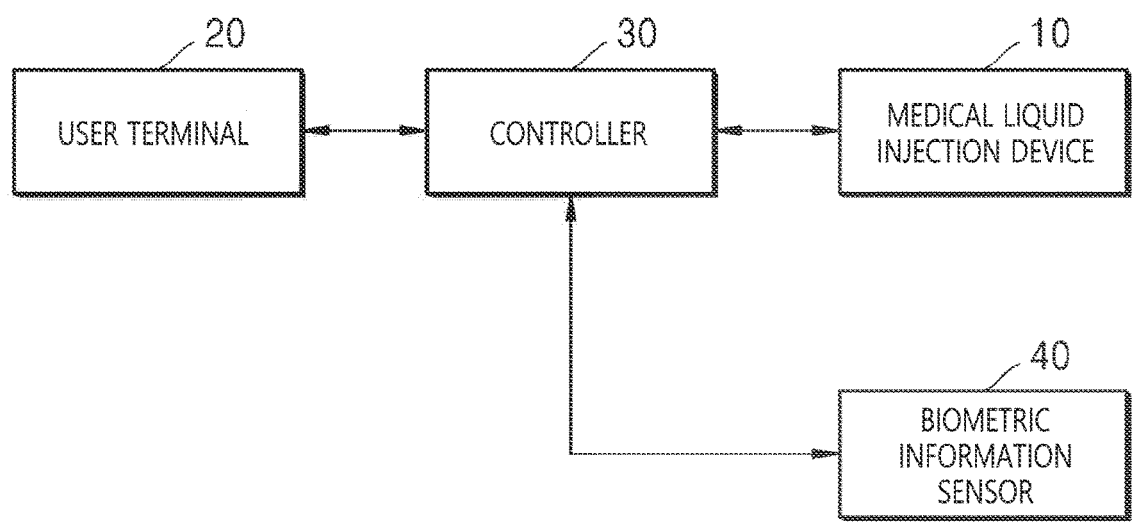
FIG. 1 is a block diagram illustrating a medical liquid injection system according to an embodiment of the present disclosure.

The present disclosure provides a medical liquid injection device including a base body, a needle assembly mounted on the base body, a reservoir fluidly connected to the needle assembly and having an inner space in which a medical liquid is stored, a plunger disposed inside the reservoir, and configured to move in a longitudinal direction of the reservoir according to an amount of the medical liquid stored in the reservoir, and a first sensor unit configured to measure the amount of the medical liquid stored in the reservoir according to the movement of the plunger.

The medical liquid injection device may include a storage unit, a plunger, a connector member, a processor, and a sensor unit. A medical liquid may be stored in the storage unit. The plunger may seal the storage unit, and may move along a longitudinal direction of the storage unit as a medical liquid is replenished in the storage unit or discharged from the storage unit. The connector member may be attached to one side of the plunger. The processor may receive a contact detection signal or a non-contact detection signal from the sensor unit disposed adjacent to the storage unit. The connector member may be in contact with or not in contact with the sensor unit while moving together with the plunger.

MODE OF DISCLOSURE

Since the present disclosure may apply various transformations and may have various embodiments, specific embodiments are illustrated in the drawings and described in detail in the detailed description. Effects and features of the present disclosure, and a method of achieving them will become apparent with reference to the embodiments described below in detail in conjunction with the drawings. However, the present disclosure is not limited to the embodiments disclosed below and may be implemented in various forms.

Hereinafter, embodiments of the present disclosure will be described in detail with reference to the accompanying drawings, and when described with reference to the drawings, the same or corresponding components are given the same reference numerals, and the overlapping description thereof will be omitted.

In the following embodiments, the singular expression includes the plural expression unless the context clearly dictates otherwise.

In the following embodiments, terms such as "include" or "have" means that the features or components described in the specification are present, and the possibility that one or more other features or components will be added is not excluded in advance.

In cases where certain embodiments may be implemented otherwise, a specific process sequence may be performed different from the described sequence. For example, two processes described in succession may be performed substantially simultaneously, or may be performed in an order opposite to the order described.

In the drawings, the size of the components may be exaggerated or reduced for convenience of description. For example, since the size and thickness of each component shown in the drawings are arbitrarily indicated for convenience of description, the following embodiment is not necessarily limited to what is illustrated.

FIG. 1 is a block diagram illustrating a medical liquid injection system 1 according to an embodiment of the present disclosure.

Referring to FIG. 1, the medical liquid injection system 1 may include a medical liquid injection device 10, a user terminal 20, a controller 30, and a biometric information sensor 40. In the medical liquid injection system 1, a user may drive and control the system by using the user terminal 20, and periodically inject a medical liquid from the medical liquid injection device 10 on the basis of blood sugar information monitored by the biometric information sensor 40.

The medical liquid injection device 10 performs a function of injecting a medical liquid such as insulin, glucagon, anesthetic, pain killer, dopamine, growth hormone, non-smoking aids, or the like to be injected to the user on the basis of data sensed by the biometric information sensor 40.

In addition, the medical liquid injection device 10 may transmit a device state message including information on a remaining battery capacity of the device, whether the device is booted successfully, whether the injection is successful, or the like to the controller 30. Messages transmitted to the controller 30 may be transmitted to the user terminal 20 via the controller 30. Alternatively, the controller 30 may transmit improved data obtained by processing the received messages to the user terminal 20.

In an embodiment, the medical liquid injection device 10 may be provided separately from the biometric information sensor 40 and installed to be spaced apart from an object. In another embodiment, the medical liquid injection device 10 and the biometric information sensor 40 may be provided as one device.

In an embodiment, the medical liquid injection device 10 can be mounted on a user's body. In addition, in another embodiment, the medical liquid injection device 10 may also be mounted on an animal and may inject a medical liquid thereto.

The user terminal 20 may receive an input signal from the user in order to drive and control the medical liquid injection system 1. The user terminal 20 may drive the medical liquid injection device 10 by generating a signal for driving the controller 30 and controlling the controller 30. In addition, the user terminal 20 may display biometric information measured from the biometric information sensor 40, and may display information on a state of the medical liquid injection device 10.

The user terminal 20 refers to a communication terminal that can be used in a wired/wireless communication environment. For example, the user terminal 20 may be a smartphone, a tablet personal computer (PC), a PC, a smart television (TV), a mobile phone, a personal digital assistant (PDA), a laptop computer, a media player, a micro-server, a global positioning system (GPS) device, an electronic book terminal, a digital broadcasting terminal, a navigation device, a kiosk, an MP3 player, a digital camera, a home appliance, a device equipped with a camera, or another mobile or non-mobile computing device. In addition, the user terminal 2 may be a wearable device, such as a watch, glasses, a hairband, or a ring, having a communication function and a data processing function. However, a terminal equipped with an application capable of Internet communication as described above may be unlimitedly employed.

The user terminal 20 may be connected to a pre-registered controller 30 on a one-to-one basis. The user terminal 20 may establish an encryption connection with the controller 30 in order to prevent the controller 30 from being driven and controlled from an external device.

In an embodiment, the user terminal 20 and the controller 30 may be separately provided as separate devices. For example, the controller 30 may be provided to a target person having the medical liquid injection device 10 mounted thereon, and the user terminal 20 may be provided to the target person or a third person. The user terminal 20 may be driven by a guardian so that the safety of the medical liquid injection system 1 may be improved.

In another embodiment, the user terminal 20 and the controller 30 may be provided as one device. The controller 30 provided together with the user terminal 20 as one device may communicate with the medical liquid injection device 10 and control injection of a medical liquid.

The controller 30 performs a function of transmitting and receiving data to and from the medical liquid injection device 10, and may transmit a control signal related to injection of a medical liquid such as insulin to the medical liquid injection device 10, and receive a control signal related to a measurement of a biometric value such as a blood sugar level from the biometric information sensor 40.

In an example, the controller 30 may transmit an instruction request for measuring a current state of a user to the medical liquid injection device 10, and receive measurement data from the medical liquid injection device 10 in response to the instruction request.

The biometric information sensor 40 may perform a function of measuring a biometric value such as a blood sugar value, blood pressure, or a heart rate of a user according to the purpose. Data measured by the biometric information sensor 40 may be transmitted to the controller 30, and a period and/or injection amount of the medical liquid may be set on the basis of the measured data. The data measured by the biometric information sensor 40 may be transmitted to the user terminal 20 and displayed.

In an example, the biometric information sensor 40 may be a sensor configured to measure a blood sugar level of an object. The biometric information sensor 40 may be a continuous glucose monitor (CGM) sensor. The GSM sensor may be attached to the object and may continuously monitor a blood sugar level.

The user terminal 20, the controller 30, and the medical liquid injection device 10 may perform communication by using a network. For example, the network may include a local area network (LAN), a wide area network (WAN), a value-added network (VAN), a mobile radio communication network, a satellite communication network, or a combination thereof. The network is a data communication network in a comprehensive sense that enables network components to communicate with each other smoothly, and may include a wired Internet, a wireless Internet, or a mobile wireless communication network. In addition, wireless communication may include, for example, wireless LAN (Wi-Fi), Bluetooth, Bluetooth low energy (BLE), Zigbee, Wi-Fi direct (WFD), ultra-wideband (UWB), infrared data association (IrDA), near field communication (NFC), 5th-Generation (5G), or the like, but the present disclosure is not limited thereto.

Figure 2:
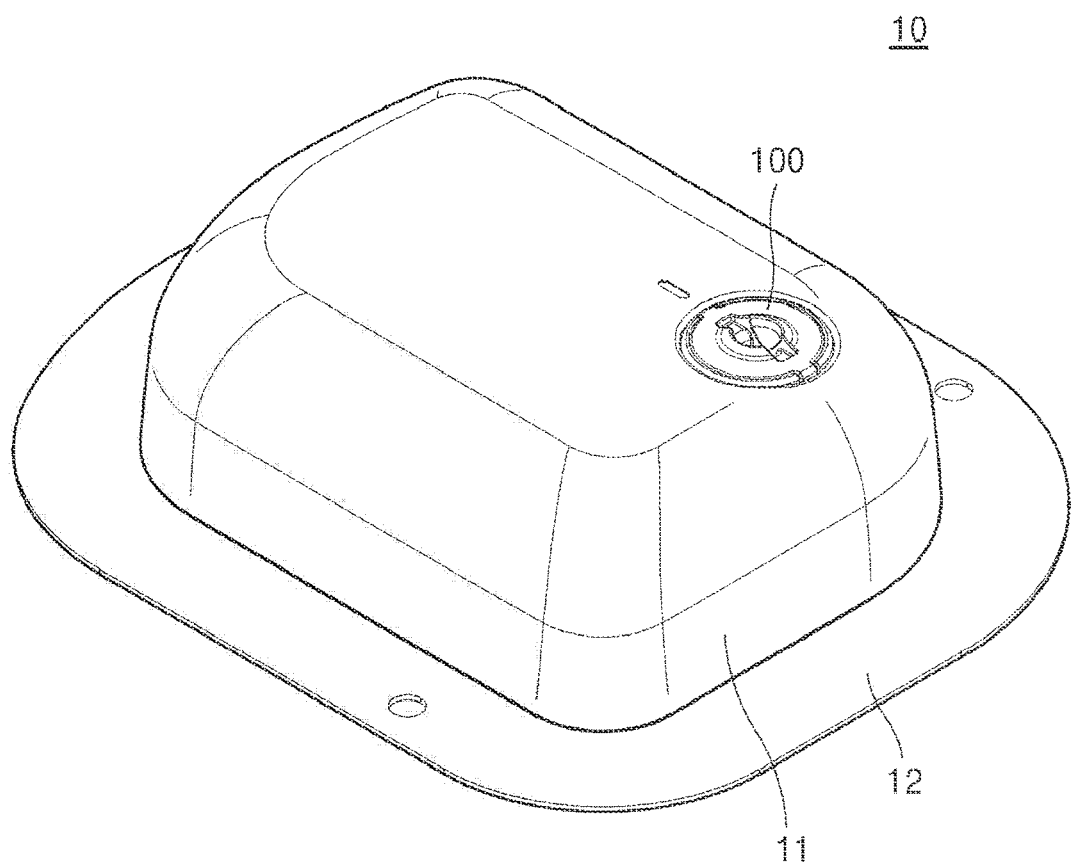
FIG. 2 is a perspective view illustrating a medical liquid injection device according to an embodiment of the present disclosure.
Figure 3:
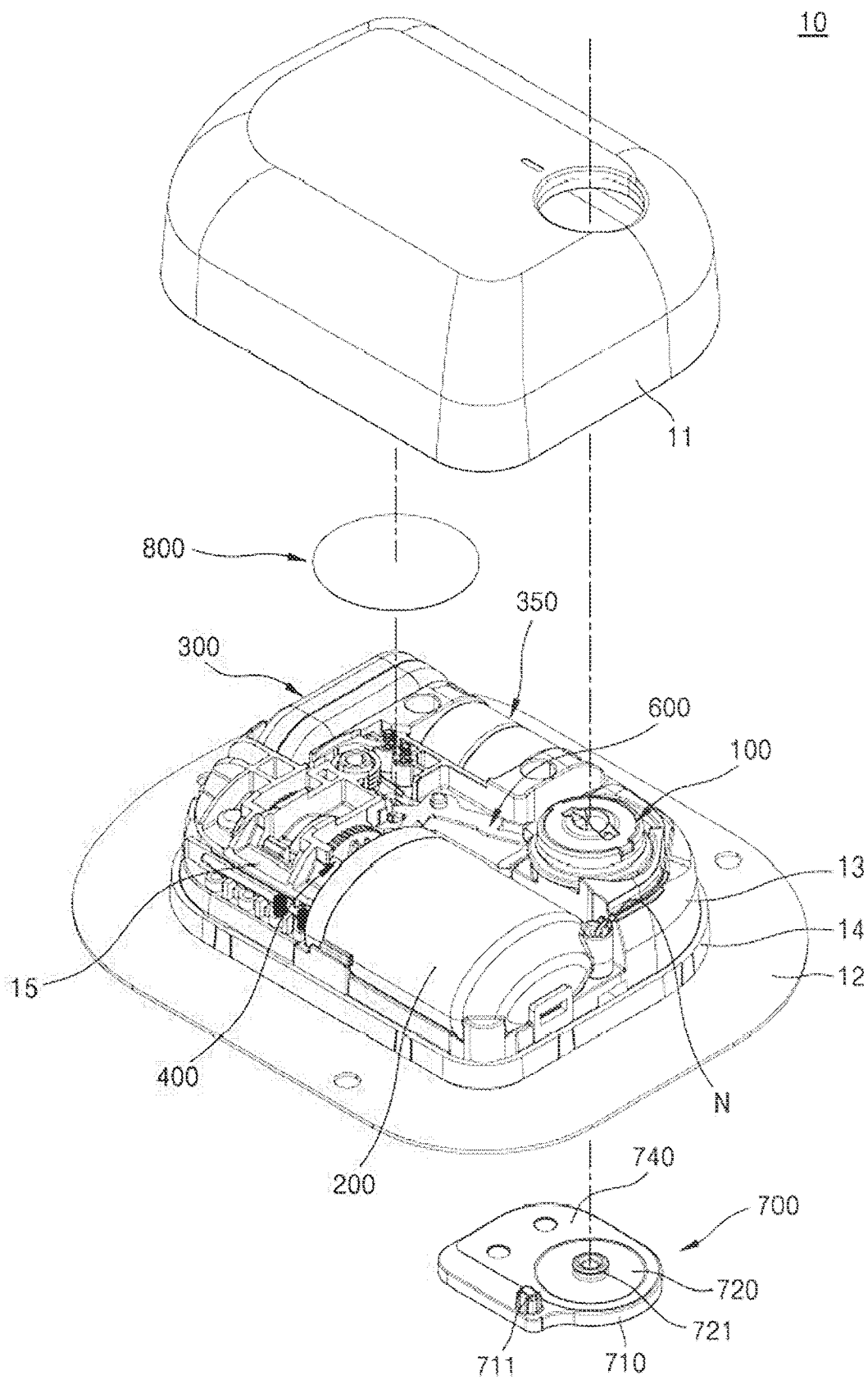
FIG. 3 is an exploded perspective view of the medical liquid injection device of FIG. 2.
Figure 4:
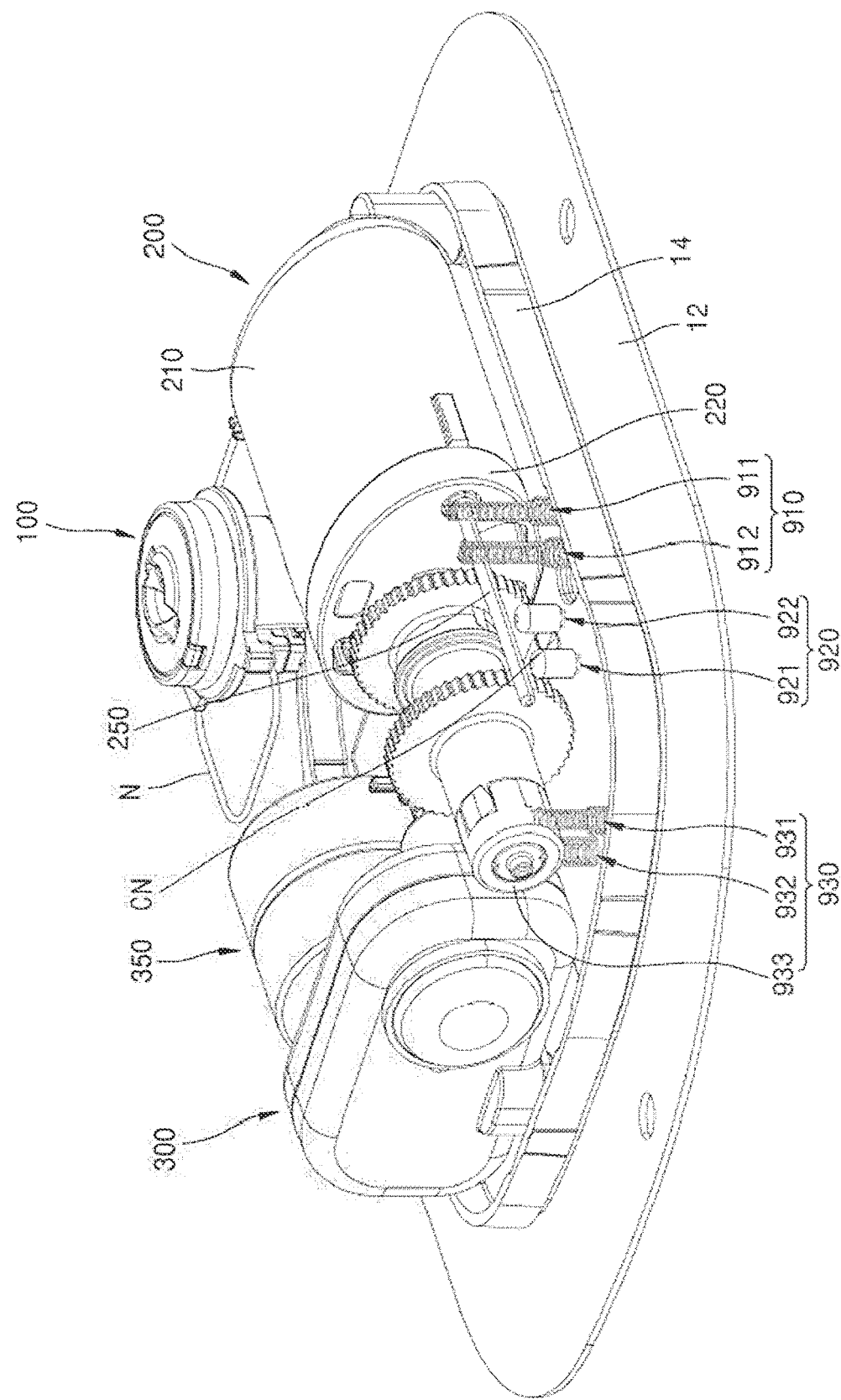
FIG. 4 is a perspective view illustrating a partial configuration of FIG. 3.
Figure 5:
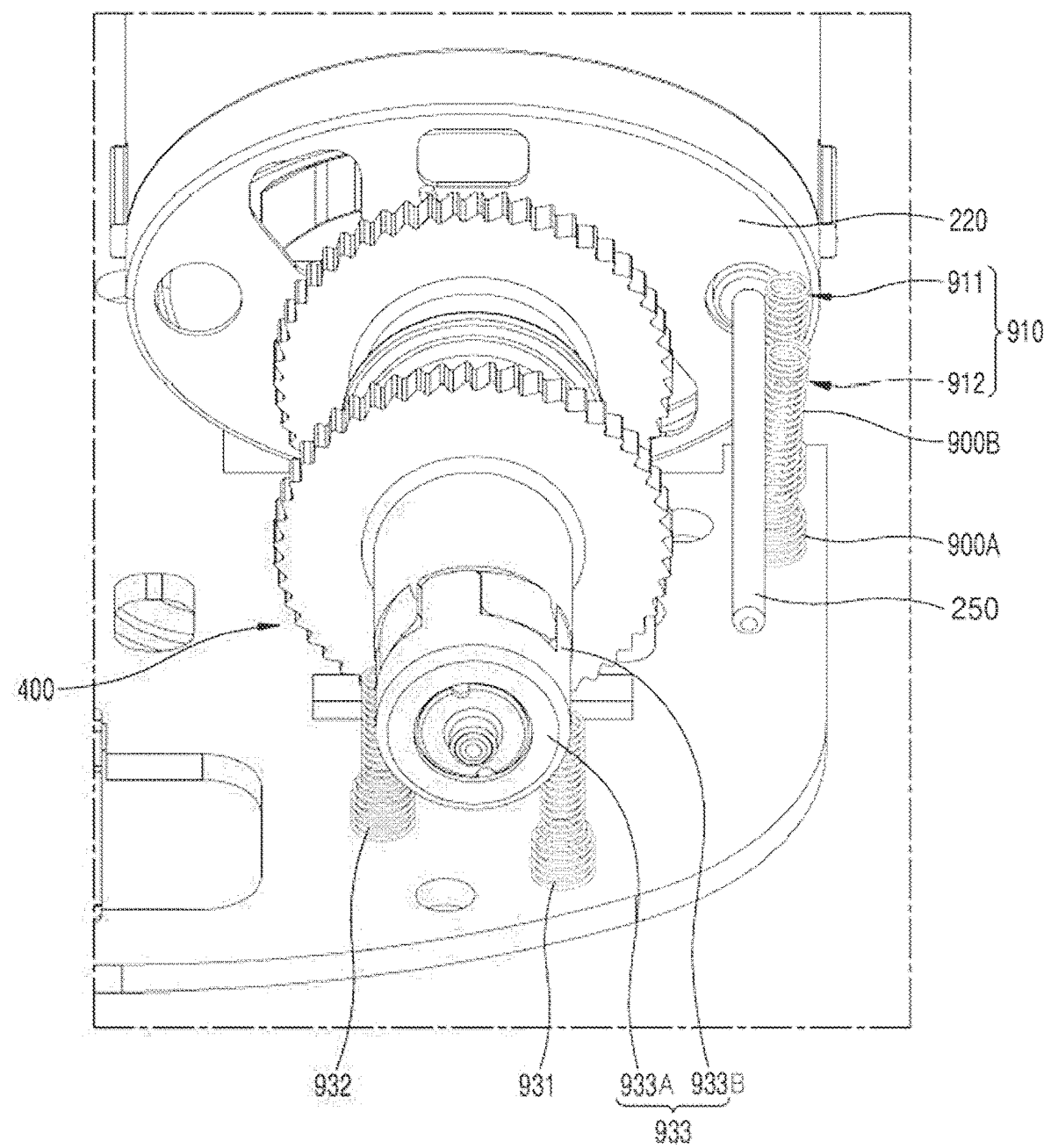
FIG. 5 is a perspective view illustrating one side of FIG. 4.

FIG. 2 is a perspective view illustrating the medical liquid injection device 10 according to an embodiment of the present disclosure, FIG. 3 is an exploded perspective view of the medical liquid injection device 10 of FIG. 2, FIG. 4 is a perspective view illustrating a partial configuration of FIG. 3, and FIG. 5 is a perspective view illustrating one side of FIG. 4.

Referring to FIGS. 2 to 5, the medical liquid injection device 10 may be attached to a user into which a medical liquid is injected, and may inject a medical liquid stored therein to the user in a set amount.

The medical liquid injection device 10 may be used for various purposes depending on the type of medical liquid to be injected. For example, the medical liquid may include an insulin-based medical liquid for a diabetic patient, and may include a medical liquid for other pancreas, a medical liquid for heart, and other various types of medical liquids.

One embodiment of the medical liquid injection device 10 may include a housing 11 for covering an outside and an attachment portion 12 located adjacent to the user's skin. The medical liquid injection device 10 includes a plurality of components disposed in an inner space between the housing 11 and the attachment portion 12. A separate bonding means may be further interposed between the attachment portion 12 and the user's skin, and the medical liquid injection device 10 may be fixed to the skin by the bonding means.

The medical liquid injection device 10 may include a needle assembly 100, a reservoir unit 200, a driving module 300, a battery 350, a driving unit 400, a clutch unit 500, a trigger member 600, a needle cover assembly 700, an alarm unit 800, and a plurality of sensor units.

The medical liquid injection device 10 may include a base body that forms a frame and is composed of one or more bodies configured to support the internal components. The base body may include a first body 13, a second body 14, and a third body 15 according to the arrangement.

The first body 13 is disposed below the housing 11, and the needle assembly 100, the reservoir unit 200, the driving module 300, the battery 350, and the like may be supported in respective openings or grooves. The second body 14 is disposed below the first body 13 and may be connected to the attachment portion 12. The second body 14 may cover a lower portion of the medical liquid injection device 10. The third body 15 is disposed above the first body 13, and the reservoir unit 200, the driving module 300, the battery 350, the driving unit 400, and the like may be supported in respective openings or grooves. The first body 13, the second body 14, and the third body 15 are illustrated in the drawings, but are not limited thereto, and may be provided as a single body or a plurality of bodies.

A control module 16 may be disposed inside the medical liquid injection device 10. The control module 16, which is a circuit board, may be disposed below the second body 14, and may control the overall driving of the medical liquid injection device 10. The control module 16 may control the driving of each of the driving module 300, the battery 350, the alarm unit 800, and the plurality of sensor units by electrically coming into contact therewith.

The needle assembly 100 may be mounted on the first body 13. In the needle assembly 100, a needle N and/or a cannula may be moved in an axial direction as a sleeve 110 rotates.

One end of the needle N may be connected to the reservoir unit 200 so that a medical liquid may be transmitted therethrough, and the other end thereof may be inserted into the cannula and may move along the cannula.

The cannula has a tube shape capable of receiving the needle N, so that the medical liquid discharged from the needle N may be injected into a user.

The cannula maintains a state of being inserted into the user's skin, but the needle N is lifted and separated from the object. However, the cannula and the needle N form a path through which a fluid moves, so that a medical liquid injected from a reservoir 210 may be injected to the user through the needle N and the cannula.

The medical liquid injection device 10 may insert the cannula into an object and start a medical liquid injection as a user simply rotates the needle assembly 100.

The reservoir unit 200 is mounted on the first body 13 and the third body 15 and is connected to the needle assembly 100. The reservoir unit 200 may store a medical liquid D in an inner space thereof and move the medical liquid in a set amount into the needle N by moving a plunger 230. The reservoir unit 200 may include the reservoir 210, a cap cover 220, the plunger 230, a sealing ring 240, and a connector member 250 (see FIG. 6).

The reservoir 210 may extend to a predetermined length in a longitudinal direction and store a medical liquid in an inner space thereof. In the reservoir 210, as the plunger 230 moves, the medical liquid may be discharged to the needle N. The cap cover 220 may be mounted on an end portion of the reservoir 210, and a rod 410 and/or a connection member 520 may move through an opening (not shown) disposed in the cap cover 220 (see FIG. 9).

The reservoir 210 may include an inlet end and an outlet end. A medical liquid may be injected into the inlet end, the needle N may be installed at the outlet end, and the medical liquid may be discharged through the needle N.

The plunger 230 is disposed inside the reservoir 210 and linearly moves by the driving of the driving module 300 and the driving unit 400. As the plunger 230 moves forward, the medical liquid may be discharged from the inner space into the needle N.

The plunger 230 may include a terminating end 231 and an inclined surface 232. The terminating end 231 may move toward a front side 210F of the reservoir 210 to move the medical liquid. The inclined surface 232 may be in close contact with an inclined portion of the reservoir 210.

The plunger 230 may be connected with a connector member 250 extending rearward. The connector member 250 is installed in the plunger 230, and may linearly move together with the plunger 230 as the plunger 230 linearly moves.

The connector member 250 may be formed of a material having electrical conductivity and may have a shaft shape. As the connector member 250 comes into contact with a first sensor unit 910 while moving, a medical liquid storage amount may be measured, and the driving of the medical liquid injection device 10 may be started.

The connector member 250 is connected to a rear end of the plunger 230, and may move together with the plunger 230 as the plunger 230 moves. The connector member 250 is illustrated in the drawings as having a shaft shape, but is not limited thereto, and may have various shapes for generating an electrical signal by coming into contact with the first sensor unit 910.

When a medical liquid is stored in the reservoir 210 and the plunger 230 moves backward, the connector member 250 may move backward together with the plunger 230. In addition, when the plunger 230 moves forward so that the medical liquid is discharged from the reservoir 210 into the needle N, the connector member 250 may move forward together with the plunger 230.

A sealing portion 240 is provided on the plunger 230 at a portion in contact with an inner side wall of the reservoir 210, so that a case in which a medical liquid leaks when the plunger 230 moves may be prevented.

The driving module 300 may generate a driving force and transmit the driving force to the driving unit 400. The driving force transmitted by the driving unit 400 linearly moves the plunger 230 in the reservoir 210 to discharge the medical liquid.

When parts in the driving unit 400 are engaged to each other by the clutch unit 500, the driving module 300 rotates a driving wheel 420 of the driving unit 400, and the rod 410 linearly moves by the rotation of the driving wheel 420 to move the plunger 230. When the plunger 230 moves, the connector member 250 may also linearly move together with the plunger 230.

All types of devices having a medical liquid suction force and a medical liquid discharge force by electricity may be used as the driving module 300. For example, all types of pumps such as a mechanical displacement type micropump and an electromagnetic motion type micropump may be used. The mechanical displacement type micropump is a pump that uses solid or fluid motion such as a gear or diaphragm to generate a pressure difference to induce fluid flow, and includes a diaphragm displacement pump, a fluid displacement pump, a rotary pump, and the like. The electromagnetic motion micropump is a pump that directly uses electrical or magnetic energy for fluid movement, and may include an electro-hydrodynamic pump (EHD), an electro-osmotic pump, a magneto-hydrodynamic pump, an electro-wetting pump, and the like.

The battery 350 may activate each component by supplying electricity to the medical liquid injection device 10. A pair of batteries 350 are illustrated in the drawings, but the present disclosure is not limited thereto, and the battery 350 may be set in various ways according to the capacity, usage range, usage time, and the like of the medical liquid injection device 10.

The battery 350 is disposed adjacent to the driving unit 400, and may supply electricity to the driving unit 400. In addition, the battery 350 is connected to the control module 16, and data on a rotation number or speed of the driving unit 400, an amount of the medical liquid stored in the reservoir 210, and an amount of the medical liquid injected into a user may be measured on the basis of an electrical signal measured by the sensor unit.

Figure 9:
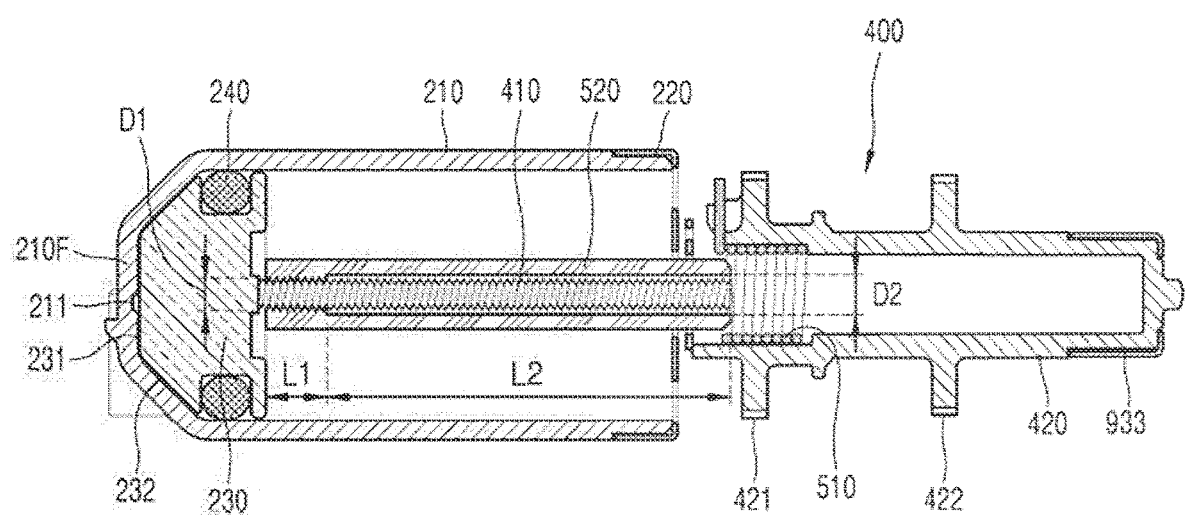
FIGS. 9 to 12 are cross-sectional views illustrating driving for injecting a medical liquid into a reservoir to store the medical liquid and discharging the medical liquid to a needle.

Referring to FIG. 9, the driving unit 400 is installed between the driving module 300 and the reservoir unit 200, and may move the plunger 230 disposed in the reservoir 210 with the driving force generated by the driving module 300. However, the driving unit 400 may move the plunger 230 forward only when the rod 410 and the driving wheel 420 are coupled or connected by the clutch unit 500.

The rod 410 is connected to the plunger 230 and extends in one direction. The rod 410 may be inserted into the opening of the cap cover 220, and the rod 410 may move in the longitudinal direction of the reservoir 210 in order to move the plunger 230. The rod 410 may have a screw thread shape on a surface thereof. The rod 410 is inserted into the connection member 520, and when a medical liquid in a set amount is discharged, the rod 410 may be connected to the driving wheel 420 by the clutch unit 500 and may move forward.

The driving wheel 420 is drivingly connected to the driving module 300, and may be rotated by the driving of the driving module 300. The driving wheel 420 includes a first connection terminal 421 and a second connection terminal 422, and may have a space therein in which the rod 410 may move. At least one of the first connection terminal 421 and the second connection terminal 422 is always drivingly connected to the driving module 300 by a connector CN, and thus the driving wheel 420 may be rotated by the driving of the driving module 300.

In an embodiment, the first connection terminal 421 and the second connection terminal 422 may each have a shape of a gear tooth. The connector CN connected to the driving module 300 may press the gear tooth so that the driving wheel 420 rotates.

Specifically, the connector CN is repeatedly rotated around a rotation axis according to the linear reciprocation of the driving module 300. An end portion of the connector CN may press at least one of the first connection terminal 421 and the second connection terminal 422 to rotate the driving wheel 420. For example, one end of the connector CN may be disposed to press the first connection terminal 421, and the other end of the connector CN may be disposed to press the second connection terminal 422.

When the connector CN rotates around the rotation axis, a second sensor unit 920 may measure the driving of the connector CN. The second sensor unit 920 may measure whether the driving force of the driving module 300 is transmitted to the driving wheel 420 by measuring whether the second sensor unit 920 is in contact with the connector CN. In addition, the second sensor unit 920 may measure an angle by which the driving wheel 420 rotates by measuring whether the second sensor unit 920 is in contact with the connector CN.

The clutch unit 500 may drivingly connect the driving module 300 and the driving unit 400. The clutch unit 500 is disposed between the rod 410 and the driving wheel 420, and may include a coupler 510 and the connection member 520.

Figure 10:
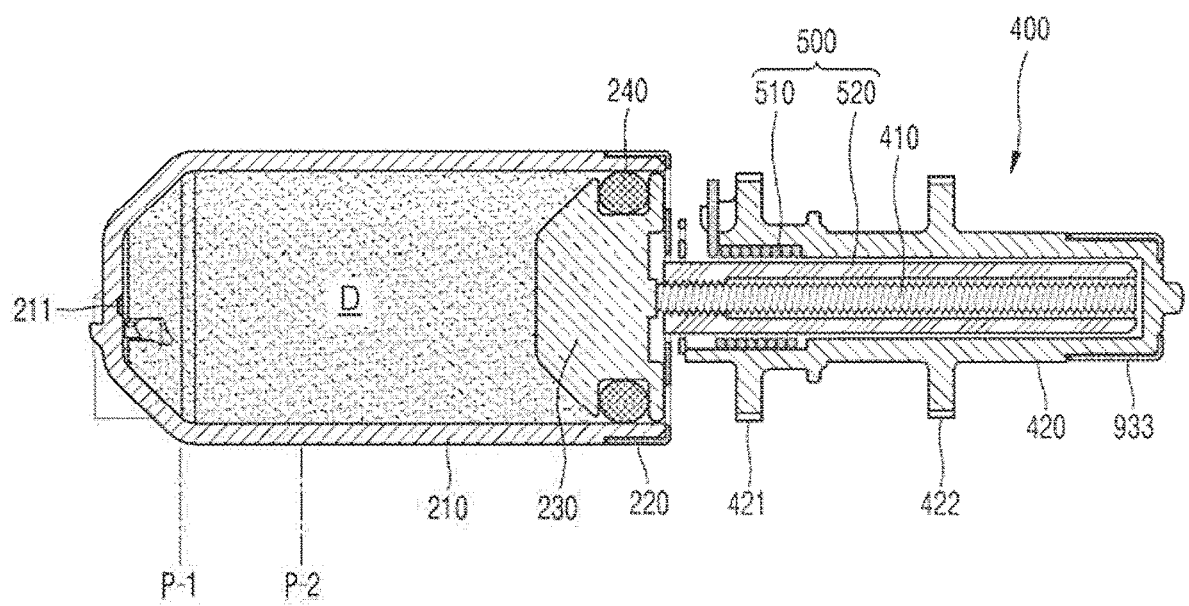
Figure 11:
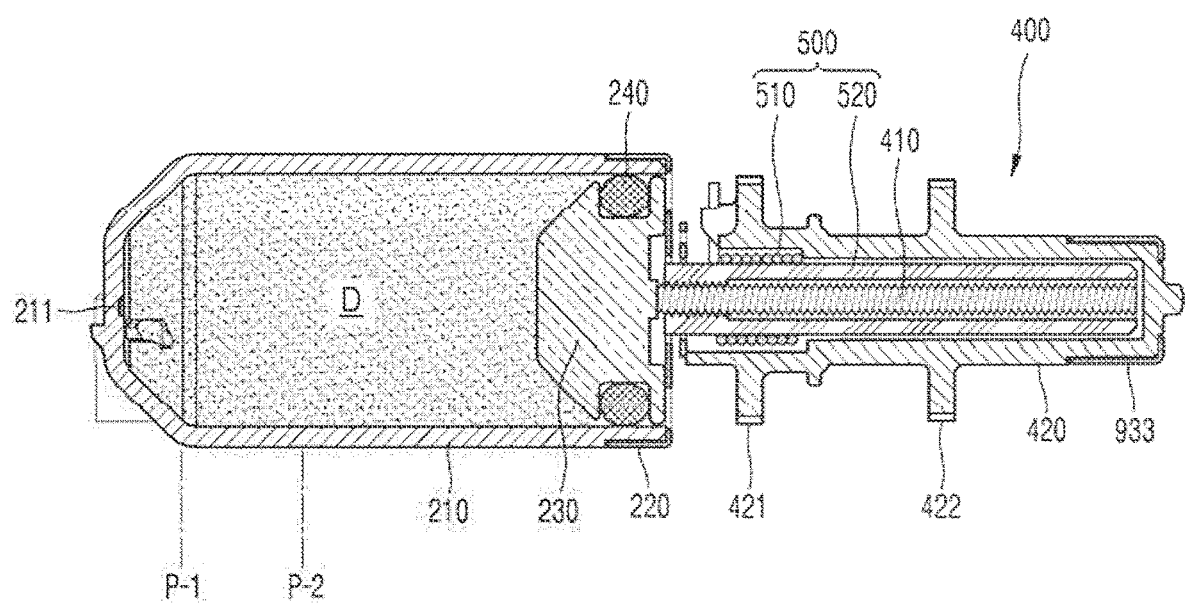
Figure 12:
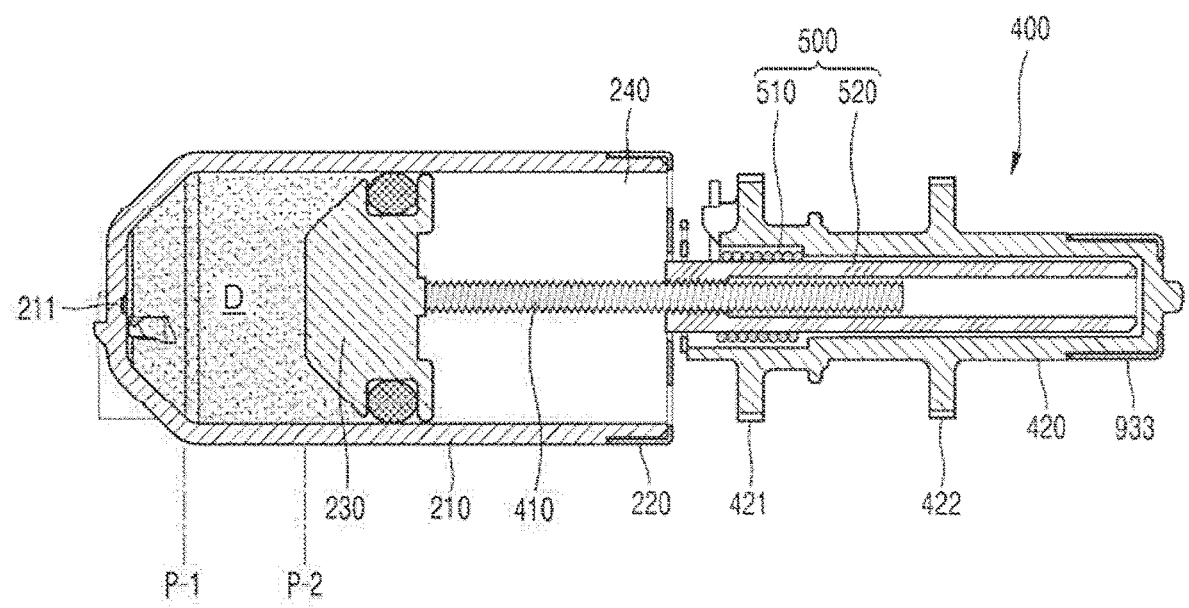

The coupler 510 is disposed outside the connection member 520 and spaced apart a predetermined distance from the connection member 520 (see FIGS. 9 and 10), and may connect the rod 410 and the driving wheel 420 when deactivated (see FIGS. 11 and 12). The coupler 510 is a component capable of pressing an outside of the connection member 520 with an elastic force and is not limited to a specific shape. However, hereinafter, for convenience of description, a case in which the coupler has a spring shape will be mainly described.

The connection member 520 may be disposed such that at least a portion thereof is inserted into the rod 410. The connection member 520 is disposed to cover an outside of the rod 410. The connection member 520 may connect the driving module 300 and the rod 410 according to the operation of the coupler 510.

In an embodiment, the rod 410 and the connection member 520 may have a screw shape and a screw thread shape, respectively. A screw thread may be formed on an outer circumferential surface of the rod 410, and a screw thread is formed on an inner circumferential surface of the connection member 520, and thus the rod 410 and the connection member 520 may be connected in a screw-coupling manner.

In an embodiment, a screw thread may be formed on one end of the inner circumferential surface of the connection member 520 but may not formed on the other end thereof.

Referring to FIG. 9, a screw thread is formed on the inner circumferential surface of the connection member 520 in a first section L1, and the connection member 520 is screw-coupled to the rod 410 only in the first section L1. In addition, a diameter of the first section L1 may correspond to the rod 410 and may have a size of D1.

A screw thread is not formed on the inner circumferential surface of the connection member 520 in a second section L2. In addition, a diameter D2 of the second section L2 may be set to be greater than the diameter D1 of the first section L1. In the second section L2, the connection member 520 is not in contact with the rod 410.

A length of the first section L1 may be set so that the first section L1 overlaps the coupler 510 when the connection member 520 moves backward. Referring to FIGS. 10 and 11, at least a portion of the first section L1 is disposed to overlap the coupler 510, that is, faces the coupler 510 when the plunger 230 extends to a rearmost position. The length of the first section L1 may be set in the connection member 520 such that the coupler 510 grips at least a portion of the first section L1 when the coupler 510 is activated.

Since the rod 410 is screw-coupled to the connection member 520 only in the first section L1, when the connection member 520 moves the rod 410 forward while rotating, a load caused by the screw-coupling between the connection member 520 and the rod 410 may be reduced.

As shown in FIGS. 11 and 12, when the coupler 510 is activated, the coupler 510 grips the connection member 520, and the connection member 520 also rotates according to the rotation of the driving wheel 420. Since the connection member 520 and the rod 410 are screw-coupled only in the first section L1, the connection member 520 can move the rod 410 forward even when the driving wheel 420 rotates with a small torque. That is, since the rod 410 and the connection member 520 are screw-coupled only in the first section L1, the plunger 230 may move forward by the driving the driving unit 400 even by relatively weak force.

The trigger member 600 may generate a mechanical signal that causes a medical liquid of the medical liquid injection device 10 to be injected. The trigger member 600 is rotatably disposed on one side of the third body 15, and the trigger member 600 rotates to start the driving of the driving module 300, and at the same time, the clutch unit 500 may drivingly connect the driving unit 400 to the driving module 300.

The trigger member 600 may rotate in one direction around the rotation axis. At this time, the trigger member 600 may press the clutch unit 500 to couple the rod to the driving wheel 420.

In detail, when a user rotates the needle assembly 100, a knob of the needle assembly 100 may press an end portion of the trigger member 600 to start the rotation of the trigger member 600. When the trigger member 600 rotates, the trigger member 600 presses an end portion of the coupler 510, and the coupler 510 is coupled to the connection member 520, thereby activating the clutch unit 500.

The needle cover assembly 700 may be mounted below the needle assembly 100. The needle cover assembly 700 may perform priming air stored in the reservoir unit 200 before injecting a medical liquid. Gas (air) remaining in the reservoir 210 may be discharged to the outside when the medical liquid is injected into the reservoir 210 through a medical liquid injector NI.

The needle cover assembly 700 may include a first cover 710, a second cover 720, a filter member 730, and an adhesive layer 740.

The first cover 710 may be disposed on the lower portion of the medical liquid injection device 10. The second cover 720 may be inserted into and assembled to an opening of the first cover 710. An insertion protrusion 711 that is inserted into the second body 14 to fix the needle cover assembly 700 may be disposed on one side of the first cover 710.

The second cover 720 may be assembled to the first cover 710, and the needle N and/or the cannula may be aligned to the center of the second cover 720. The second cover 720 may have a storage space passing through the center of the second cover 720 in a height direction and configured to store the medical liquid D.

The first cover 710 has a greater rigidity than the second cover 720. The first cover 710 is a part exposed to the outside, and is formed of a material having a relatively larger rigidity. The second cover 720 is assembled to the first cover 710, and is formed of a material having a smaller rigidity than the first cover 710 in order to be inserted into an opening of the third body 15.

A protrusion 721 inserted into the third body 15 may be provided at the center of the second cover 720. In addition, the second cover 720 may include a fixing protrusion 722, and the fixing protrusion 722 may be inserted into the first cover 710 so that the first cover 710 is assembled to second cover 720.

The filter member 730 is mounted to the second cover 720. The filter member 730 is disposed below the storage space of the second cover 720, and a gas such as air passes through the filter member 730, but a liquid such as a medical liquid does not pass through the filter member 730. Thus, the air discharged from the needle N passes through the filter member 730 and is discharged to the outside, but the medical liquid discharged from the needle may be stored in the storage space defined by the second cover 720 and the filter member 730.

The filter member 730 may be changed in shape according to the amount of the medical liquid stored in the storage space. For example, when the storage space is filled with a medical liquid, the filter member 730 expands downward so that a user can recognize that the medical liquid is introduced into the needle cover assembly 700.

The adhesive layer 740 is disposed on one surface of the needle cover assembly 700, and may attach the needle cover assembly 700 to the attachment portion 12.

The alarm unit 800 is disposed inside or outside the medical liquid injection device 10, and a normal operation or malfunction of the medical liquid injection device 10 may be notified to a user by the alarm unit 800.

In an example, the alarm unit 800 is disposed below the housing 11 and is connected to a circuit board. The alarm unit 800 may transmit an alarm to an external user by generating a warning sound or light.

Figure 6:
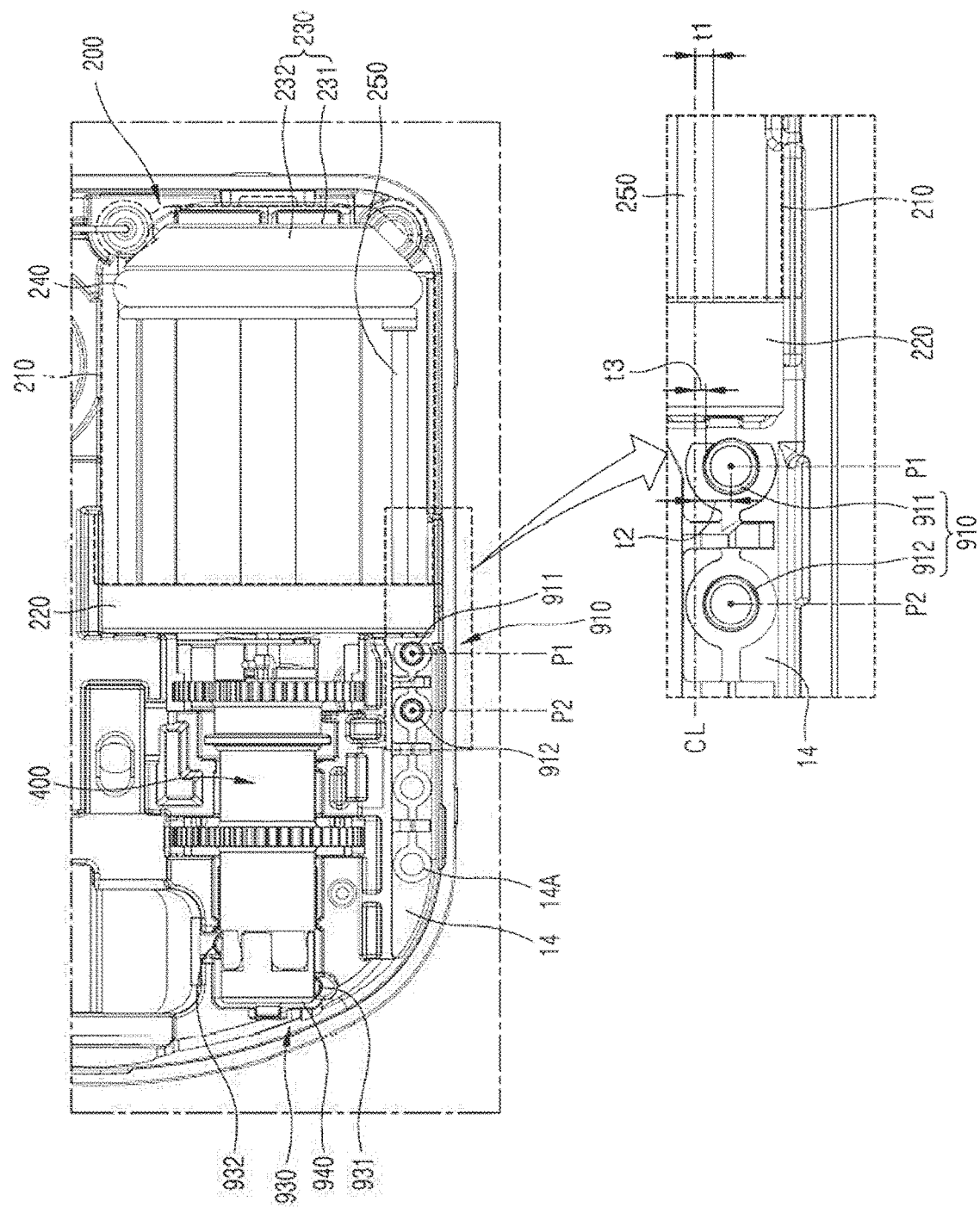
FIGS. 6 and 7 are plan views illustrating driving for sensing a flow rate of a reservoir.
Figure 7:
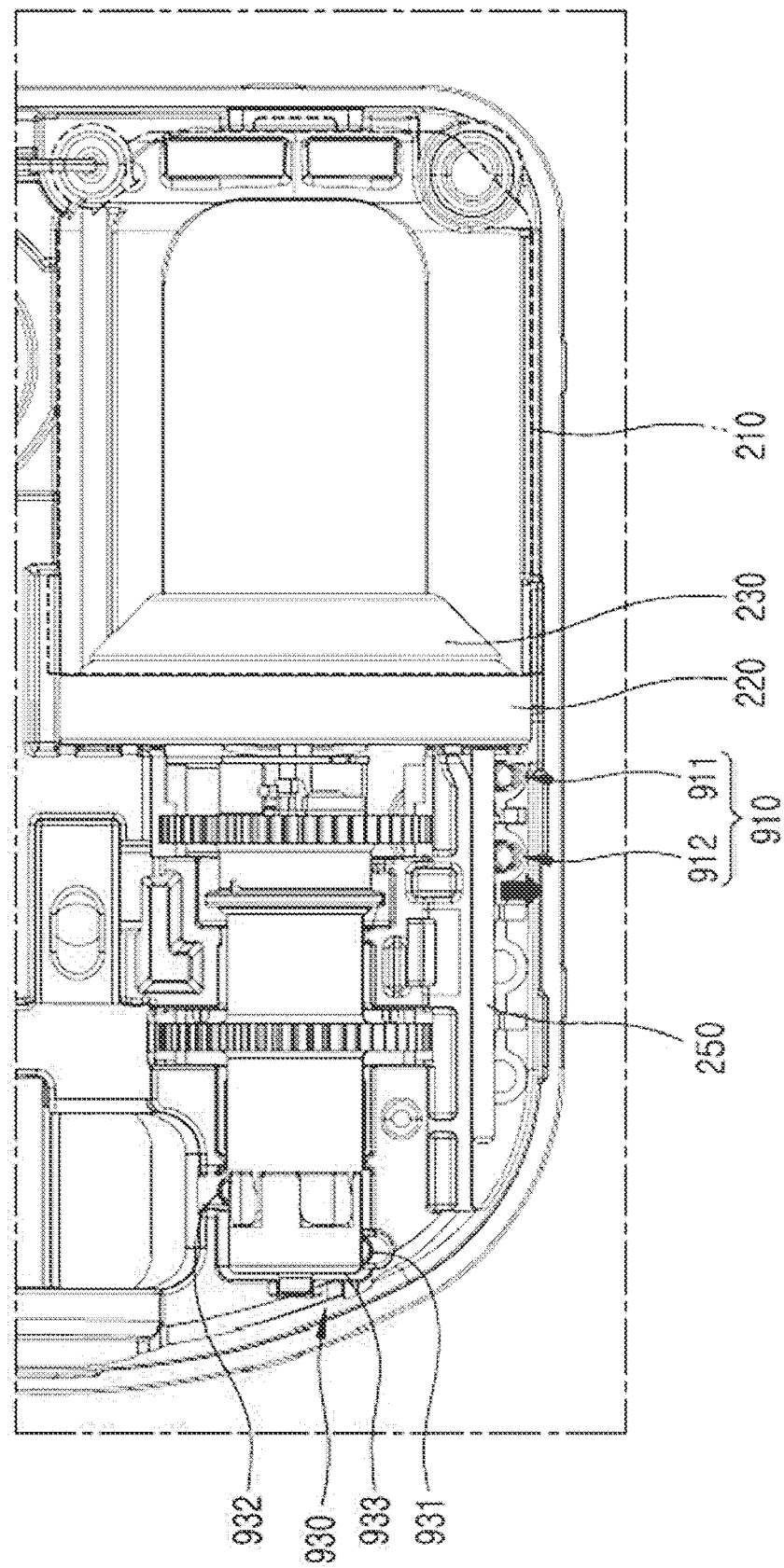
Figure 8:
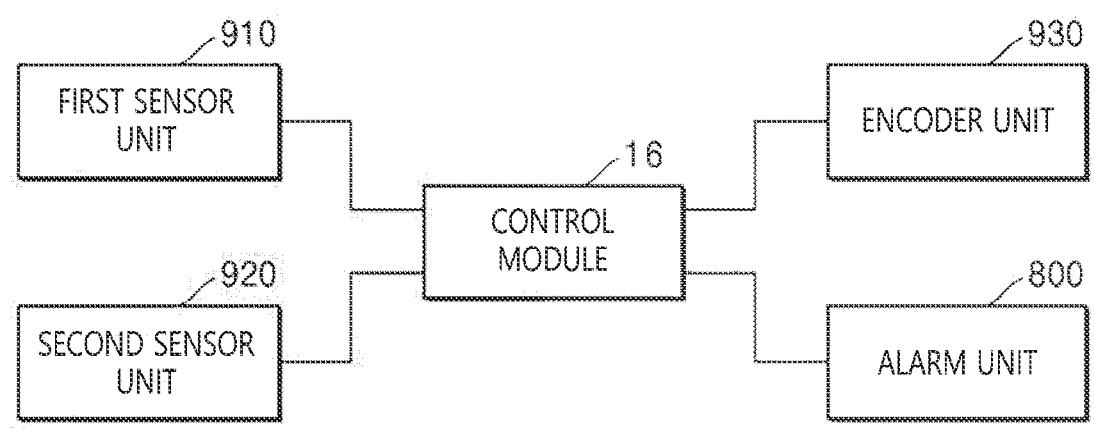
FIG. 8 is a block diagram illustrating a partial configuration of the medical liquid injection device of FIG. 2.

FIGS. 6 and 7 are plan views illustrating driving for sensing a flow rate of the reservoir 210, and FIG. 8 is a block diagram illustrating a partial configuration of the medical liquid injection device 10 of FIG. 2.

Referring to FIGS. 4 to 8, the plurality of sensor units may measure the driving of the medical liquid injection device 10. The plurality of sensor units may measure a medical liquid storage amount of the reservoir 210, or may measure whether the driving module 300 is driven, whether the driving unit 400 is driven, a rotation angle of the driving wheel 420, a movement distance of the plunger 230, and the like.

Each of the sensor units may have a plurality of contact terminals. Each event or data may be measured by measuring whether the contact terminal is electrically contacted.

As the contact terminal comes into contact with another component, a position of any one end portion of the contact terminal may be changed, and when the contact with another component is released, the one end portion may return to its original position by a restoring force.

In an embodiment, the contact terminal may have a shape of an elastic spring. In the contact terminal, a first end portion 900A may be connected to the control module 16 that is a circuit board, and a second end portion 900B may extend from the first end portion 900A and may be in contact with the connector member 250.

A diameter of the first end portion 900A may be set to be greater than a diameter of the second end portion 900B. Since the diameter of the first end portion 900A is formed to be greater than the diameter of the second end portion 900B, the first end portion 900A may be firmly supported on the circuit board. The first end portion 900A may be stably supported on the control module 16, and the second end portion 900B may be easily deformed in position or shape to stably maintain the contact with other components.

A length of the first end portion 900A may be set to be less than a length of the second end portion 900B. Since the length of the first end portion 900A is less than the length of the second end portion 900B, the first end portion 900A may be firmly supported on the circuit board. The first end portion 900A may be stably supported on the control module 16, and the second end portion 900B may be easily deformed in position or shape to stably maintain the contact with other components.

In particular, since the diameter of the second end portion 900B is set to be less than the diameter of the first end portion 900A and the length of the second end portion 900B is set to be greater than the length of the first end portion 900A, even when the second end portion 900B comes into contact with another component such as the connector member 250, a base cover 933, or the like, the second end portion 900B may be easily deformed in position or shape, and may stably maintain the contact with other components.

The first sensor unit 910 is disposed adjacent to the reservoir unit 200. The first sensor unit 910 may be disposed on a movement path of the connector member 250. The first sensor unit 910 may include a plurality of contact terminals, and the plurality of contact terminals may be mounted in a fixing groove 14A of the second body 14. The connector member 250 may come into contact with at least one of the plurality of contact terminals while moving.

In an embodiment, the first sensor unit 910 may include a first contact terminal 911 and a second contact terminal 912. The first contact terminal 911 and the second contact terminal 912 are disposed to be spaced apart from each other, and the connector member 250 may come into contact with the first contact terminal 911 and/or the second contact terminal 912 by linearly moving.

The connector member 250 may come into contact with the first contact terminal 911 at a first position P1 and come into contact with the second contact terminal 912 at a second position P2.

Referring to FIGS. 6, 9, and 10, in a process in which the medical liquid D is injected into the reservoir 210, the connector member 250 may come into contact with the first contact terminal 911 first at the first position P1 (the plunger 230 is at a position P-1), and then, and the connector member 250 may come into contact with the second contact terminal 912 at the second position P2 (the plunger 230 is at a position P-2).

In an embodiment, the connector member 250 may electrically connect the first contact terminal 911 and the second contact terminal 912. When the first contact terminal 911 and the second contact terminal 912 are electrically connected through the connector member 250, this is recognized by the control module 16 as a specific event of the reservoir unit 200.

For example, when the connector member 250 is in contact with the first contact terminal 911 and the second contact terminal 912, the first sensor unit 910 may sense that the medical liquid stored in the reservoir 210 is stored in a first reference amount (e.g., 10%, 20%, 30%, or the like).

When it is recognized that the medical liquid D is stored in the reservoir 210 in the set first reference amount, the control module 16 may awake the medical liquid injection device 10 That is, the control module 16 may confirm that a certain amount of medical liquid is stored in the reservoir 210 and start partial driving to preheat the medical liquid injection device 10 (a first mode).

In another embodiment, the connector member 250 may come into contact with at least one of the contact terminals of the first sensor unit 910 to generate an electrical signal. When the connector member 250 is in contact with the first contact terminal 911, this is recognized by the control module 16 as a first event, and when the connector member 250 is in contact with the second contact terminal 912, this is recognized by the control module 16 as a second event.

For example, the connector member 250 may come into contact with the first contact terminal 911 to awake the medical liquid injection device 10, and come into contact with the second contact terminal 912 to sense the storage amount of the medical liquid stored in the medical liquid injection device 10.

For example, the amount of the medical liquid stored in the reservoir 210 may be primarily sensed as the connector member 250 comes into contact with the first contact terminal 911 to awake the medical liquid injection device 10, and the storage amount of the medical liquid stored in the medical liquid injection device 10 may be secondarily sensed as the connector member 250 comes into contact with the second contact terminal 912.

Referring to FIGS. 6, 11, and 12, in a process in which the medical liquid D is discharged into the needle N, the connector member 250 is released from the contact with the second contact terminal 912 first at the second position P2 (the plunger 230 is at the position P-2), and then, and the connector member 250 is released from the contact with the first contact terminal 911 at the first position P1 (the plunger 230 is at the position P-1).

In an embodiment, when the connector member 250 maintains the contact with the first contact terminal 911 and the second contact terminal 912 and then is released from the contact with the second contact terminal 912, the electrical connection between the first contact terminal 911 and the second contact terminal 912 is released. When the electrical connection of the first contact terminal 911 and the second contact terminal 912 is released, this is recognized by the control module 16 as a specific event of the reservoir unit 200.

In detail, when the second contact terminal 912 is electrically separated, the control module 16 may generate a signal indicating that the medical liquid D stored in the reservoir 210 is not sufficient. The control module 16 may generate an alarm signal and transmit the alarm signal to the controller 30, the user terminal 20, and/or the alarm unit 800 so that a user recognizes the medical liquid amount.

In addition, when a third mode is set in the medical liquid injection device 10, a moving-forward distance of the plunger 230 within the reservoir 210 may be accurately measured using the second sensor unit 920 and/or an encoder unit 930, and the amount of the medical liquid stored in the reservoir 210 may be precisely measured and monitored.

In another embodiment, as the connector member 250 is released from the contact with at least one of the contact terminals of the first sensor unit 910, different events may be recognized. When the connector member 250 is released from the contact with the second contact terminal 912, this is recognized by the control module 16 as the third event, and when the connector member 250 is released from the contact with the first contact terminal 911, this is recognized by the control module 16 as a fourth event.

For example, when the connector member 250 is released from the contact with the second contact terminal 912, the control module 16 may transmit an alarm signal to a user, and when the connector member 250 is released from the contact with the first contact terminal 911, the control module 16 may forcibly terminate the operation of the medical liquid injection device 10, continuously generate an alarm signal to the user terminal 20, or reduce the amount of the medical liquid injected to a user or increase an injection period.

Referring to FIG. 6, the first sensor unit 910 may be spaced apart from a center line CL of the connector member 250 in the longitudinal direction, and the surface of the contact terminal may be disposed to be in contact with the surface of the connector member 250.

The connector member 250 extends with respect to the center line CL and linearly moves along the center line CL. In addition, an outer circumferential surface of the connector member 250 is spaced apart from the center line CL by a length of t1. The center of each of the plurality of contact terminals is spaced apart from the center line CL by t2, and the surface of each of the plurality of contact terminals is spaced apart from the center line CL by t3.

A size of t1 is set to be greater than a size of t3, and thus, when the connector member 250 moves backward along the center line CL, the connector member 250 may come into contact with the first contact terminal 911 at a point P1 and come into contact with the second contact terminal 912 at a point P2. In addition, when the connector member 250 moves forward along the center line CL, the connector member 250 is released from the contact with the second contact terminal 912 at the point P2, and may be released from the contact with the first contact terminal 911 at the point P1.

The second sensor unit 920 may sense whether the driving module 300 and/or the driving unit 400 are driven. The driving module 300 is drivingly connected to the driving wheel 420 by the connector CN. When the driving module 300 linearly moves, the connector is repeatedly rotated around the rotation axis, and both ends of the connector CN alternately press the first connection terminal 421 and the second connection terminal 422 of the driving wheel 420 to rotate the driving wheel 420. The second sensor unit 920 may measure whether the connector CN rotates around the rotation axis and the number of rotations.

The second sensor unit 920 may measure a movement distance of the plunger 230, a discharge amount of the medical liquid discharged through the needle N, and an amount of the medical liquid remaining in the reservoir 210. The second sensor unit 920 measures how much the connector CN rotates the driving wheel 420. When the rotation angle of the driving wheel 420 is measured by the second sensor unit 920, a distance by which the plunger 230 linearly moves may be calculated, and the medical liquid discharged from the reservoir 210 and the medical liquid remaining in the reservoir 210 may be measured through the movement distance.

The second sensor unit 920 may have a 1A-th contact terminal 921 and a 2A-th contact terminal 922. When the connector CN comes into contact with the 1A-th contact terminal 921, this is measured by the second sensor unit 920 that the connector CN presses one of the first connection terminal 421 and the second connection terminal 422. When the connector CN comes into contact with the 2A-th contact terminal 922, this is measured by the second sensor unit 920 that the connector CN presses another one of the second connection terminal 422 and the second connection terminal 422.

The encoder unit 930 is disposed at one end of the driving unit 400, and may measure the rotation of the driving unit 400. The encoder unit 930 may measure the rotation of the driving wheel 420.

The encoder unit 930 may include the base cover 933 having a 1B-th contact terminal 931, a 2B-th contact terminal 932, a cover end 933A, and a tooth end 933B.

The 1B-th contact terminal 931 is disposed at an end portion of the base cover 933, and thus may always maintain the contact with the base cover 933. The 1B-th contact terminal 931 may selectively maintain the contact with the cover end 933A.

In the drawing, the 1B-th contact terminal 931 is illustrated as being disposed on a side opposite to the 2B-th contact terminal 932, but the present disclosure is not limited thereto. For example, the 1B-th contact terminal 931 and the 2B-th contact terminal 932 may be disposed on the same side of the driving wheel 420. In addition, the 1B-th contact terminal 931 may be disposed on a rear side of the driving wheel 420.

The 2B-th contact terminal 932 is disposed on an end portion of the base cover 933, and may be disposed to be spaced apart from the 1B-th contact terminal 931. The 2B-th contact terminal 932 is disposed to be in contact with the tooth end 933B, and may come into contact with the tooth end 933B or may be released from the contact with the tooth end 933B according to the rotation of the driving wheel 420.

The base cover 933 is inserted into one end of the driving wheel 420. The cover end 933A extends to encircle an outer circumferential surface of the driving wheel 420. However, the tooth end 933B extends from the cover end 933A, and a plurality of tooth ends 933B may be disposed to be spaced apart from each other along the outer circumferential surface of the driving wheel 420. The tooth end 933B may extend from the cover end 933A in a longitudinal direction of the driving wheel 420.

In an embodiment, a width W1 of the tooth end 933B may be set to be less than a distance W2 between adjacent tooth ends. Since the width W1 is set to be less than the width W2, an error generated when the 2B-th contact terminal comes into contact with the tooth end 933B may be reduced.

The encoder unit 930 may measure whether the second sensor unit 920 is normally driven by sensing the rotation of the driving wheel 420. When the rotation of the driving wheel 420 is measured by the encoder unit 930 when the medical liquid injection device 10 operates normally, the contact of the connector CN should also be made by the second sensor unit 920. When the encoder unit 930 measures that the driving wheel 420 does not rotate, the contact of the connector CN should not occur even in the second sensor unit 920. Accordingly, by comparing a signal measured by the encoder unit 930 with a signal measured by the second sensor unit 920, the encoder unit 930 may check an error of the second sensor unit 920.

When the 2B-th contact terminal 932 comes into contact with the tooth end 933B, the 1B-th contact terminal 931 and the 2B-th contact terminal 932 are electrically connected, and the encoder unit 930 senses an electrical connection signal. When the driving wheel 420 further rotates, the 2B-th contact terminal 932 is separated from the tooth end 933B, and the 2B-th contact terminal 932 is electrically separated from the 1B-th contact terminal 931. The encoder unit 930 may measure a rotation angle and a rotation speed of the driving wheel 420 by measuring whether the 1B-th contact terminal 931 and the 2B-th contact terminal 932 are electrically connected and separated and the number of the electrical connections.

Figure 13:
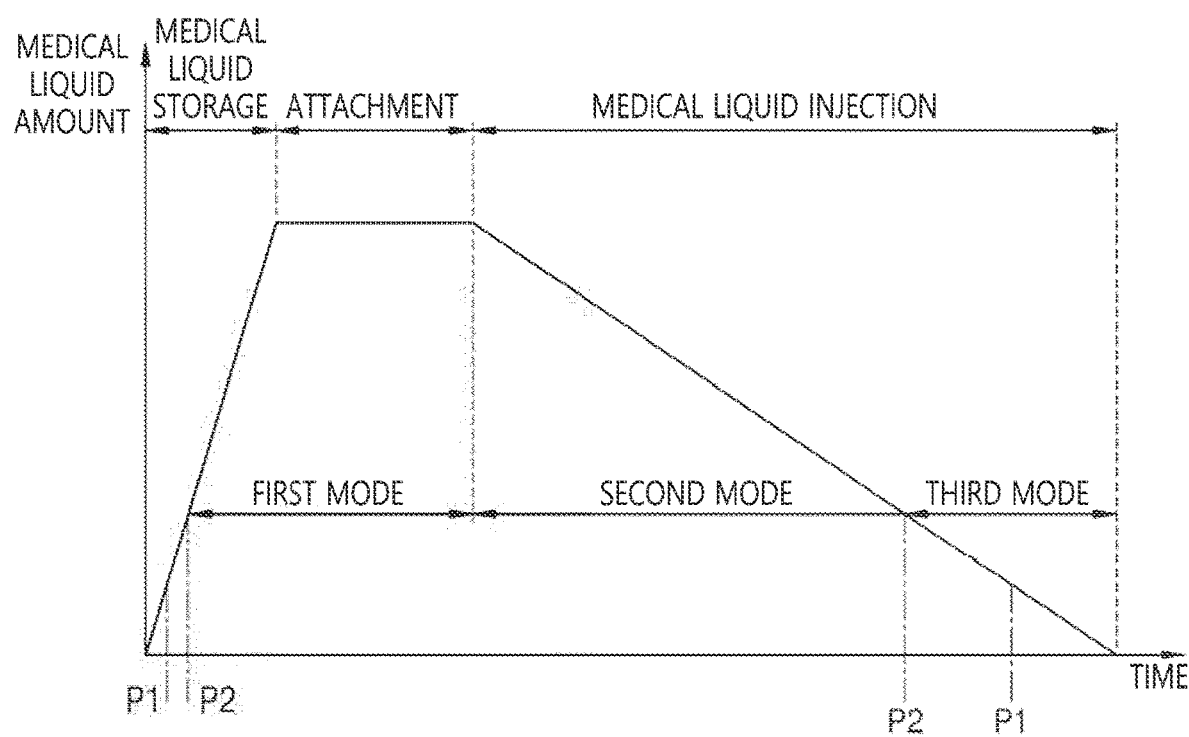
FIG. 13 is a graph illustrating a change in a medical liquid amount and a change in a driving mode according to the driving of the medical liquid injection device.

FIGS. 9 to 12 are cross-sectional views illustrating driving for injecting a medical liquid into the reservoir 210 to store the medical liquid and discharging the medical liquid to the needle N, and FIG. 13 is a graph illustrating a change in a medical liquid amount and a change in a driving mode according to the driving of the medical liquid injection device 10.

Referring to FIGS. 9 to 13, a process in which the medical liquid D is stored in the reservoir 210 and then discharged from the reservoir 210 to the needle N to be injected into a user, before the medical liquid injection device 10 is attached to the user, will be described as follows.

<Medical Liquid Storage Operation>

A user injects a medical liquid into the reservoir unit 200 of the medical liquid injection device 10 using an external medical liquid injector (not shown). Referring to FIG. 9, before the medical liquid is injected, the plunger 230 is disposed at a front end of the reservoir 210, and the rod 410 is assembled to the connection member 520 at a rear end of the plunger 230. In this case, since the coupler 510 does not grip the connection member 520, the driving wheel 420 is not connected to the rod 410.

The user puts the medical liquid D to be injected into the medical liquid injector (not shown), and inserts the medical liquid injector into an inlet end of the reservoir unit 200. At this time, air priming may be performed for air remaining inside the reservoir 210.

In detail, in a process of assembling the reservoir unit 200, air remains between the reservoir 210 and the plunger 230. When the medical liquid is injected while the air remains in the reservoir 210, there is a risk of injecting the air to the user together, and thus an operation (priming operation) for removing the air is required.

When the medical liquid starts to flow into the reservoir 210 from the medical liquid injector the remaining gas is pushed into the needle N as the medical liquid flows into between the plunger 230 and an inner surface of the reservoir 210. At this time, the gas may move along a guide groove 211. That is, the gas remaining inside the reservoir 210 may be discharged to the needle N along the guide of the guide groove 211 by the flowing medical liquid D. The gas passing through the needle N moves to the needle cover assembly 700 and passes through the filter member 730 of the needle cover assembly 700 to be discharged to the outside. By the guide of the guide groove 211, the gas remaining inside the reservoir 210 may be quickly discharged to the outside, thereby removing the gas of the reservoir 210.

The first sensor unit 910 may be driven according to the amount of the medical liquid D injected into the reservoir 210.

When the plunger 230 passes through the point P-1 according to the injection of the medical liquid D, the connector member 250 comes into contact with the first contact terminal 911 at the first position P1. Thereafter, when the plunger 230 passes through the point P-2, the connector member 250 comes into contact with the second contact terminal 912 at the second position P2.

In an embodiment, when the connector member 250 electrically connects the first contact terminal 911 and the second contact terminal 912, a first mode is driven. The first mode is a mode in which the medical liquid injection device 10 is woken up, and thereafter, the medical liquid injection device 10 may be preheated so that the medical liquid injection device 10 is immediately driven when the medical liquid injection device 10 is attached to a user. In addition, by notifying the user of the fact that the medical liquid D is stored in the reservoir 210 by a preset first reference amount through the user terminal 20 or the like, the user may be notified in advance to use the medical liquid injection device 10.

In another embodiment, when the connector member 250 is connected to the first contact terminal 911, this is recognized by the control module 16 as a first event, and when the connector member 250 is connected to the second contact terminal 912, this is recognized by the control module 16 as a second event. That is, when the connector member 250 comes into contact with each of the different contact terminals, this is recognized as a different event, and the events may be transmitted to the user.

<Attachment Operation>

When the medical liquid D is stored in the reservoir 210 as shown in FIG. 10, the medical liquid injection device 10 is attached to the user. Since the gas in the reservoir 210 is removed (the priming operation is completed) through the needle cover assembly 700 in the above-described medical liquid storage operation, the needle cover assembly 700 is removed from the medical liquid injection device 10.

The user attaches the medical liquid injection device 10 thereto, rotates the needle assembly 100, and inserts the needle N and the cannula into the skin. The needle N is inserted into the skin together with the cannula, and may induce the cannula to be inserted into the skin.

Thereafter, the needle N is withdrawn from the skin, but the state in which the needle N and the cannula are connected is maintained. When the user further rotates the needle assembly 100, the needle N moves upward while the cannula is inserted into the skin. At least a portion of each of the cannula and the needle N is connected to each other, and a path through which the medical liquid moves is formed and maintained.

<Medical Liquid Injection Operation-Second Mode>

The driving module 300 and the driving unit 400 are driven substantially simultaneously with the operation of inserting the cannula and the needle N to the user. In a second mode, the medical liquid injection device 10 may inject the medical liquid D into the user according to a set period and injection amount.

When the user rotates the needle assembly 100 to insert the needle N and the cannula into the skin, a trigger member 600 drives the driving module 300. When the driving module 300 is driven, the connector CN rotates the driving wheel 420 while rotating around the rotation axis. The connector CN may rotate the driving wheel 420 in one-tooth unit while alternately pressing the first connection terminal 421 and the second connection terminal 422.

When the user rotates the needle assembly 100, the trigger member 600 may activate the coupler 510 as shown in FIG. 11. When the coupler 510 grips an outside of the connection member 520, the driving wheel 420, the coupler 510, and the connection member 520 are integrated into one body. Accordingly, when the driving wheel 420 rotates, the connection member 520 rotates together therewith, and the rod 410 moves forward.

When the rod 410 moves forward, the plunger 230 also moves forward, thereby discharging the medical liquid into the needle N. Accordingly, the medical liquid may be injected into the user according to a set driving period and speed of the driving module 300.

At this time, the second sensor unit 920 may measure the rotation of the connector CN. The 1A-th contact terminal 921 and the 2A-th contact terminal 922 of the second sensor unit 920 alternately come into contact with the corresponding end portion of the connector CN. The second sensor unit 920 senses the contact between the 1A-th contact terminal 921 and one end of the connector CN, and senses the contact between the 2A-th contact terminal 922 and the other end of the connector CN.

In an embodiment, when the contact terminal of the second sensor unit 920 comes into contact with the connector CN, the second sensor unit 920 may sense an electrical signal. In another embodiment, when the contact terminal of the second sensor unit 920 comes into contact with the connector CN, the second sensor unit 920 may sense an impact signal according to an impact.

On the basis of data obtained by measuring the rotation of the connector, the second sensor unit 920 may measure whether the driving module 300 and the connector CN are driven, measure whether the driving wheel 420 is driven by the connector CN, measure a rotation angle and/or a rotation speed of the driving wheel 420, measure a movement distance of the plunger 230 and a medical liquid injection amount by the rotation of the driving wheel 420.

When the driving wheel 420 rotates, the encoder unit 930 may measure a rotation angle, a rotation speed, or the like of the driving wheel 420. The 1B-th contact terminal 931 maintains an electrical contact with the cover end 933A, and the 2B-th contact terminal 932 maintains an electrical contact with the tooth end 933B, but the electrical contact may be released when deviating from the tooth end 933B.

The encoder unit 930 may measure data related to the rotation of the driving wheel 420 by measuring an electrical connection signal and/or an electrical release signal. The control module 16 may calculate the rotation angle and the rotation speed of the driving wheel 420 on the basis of the data measured by the encoder unit 930, and calculate the movement distance of the plunger 230 and a medical liquid discharge amount on the basis of the rotation speed and the rotation speed.

<Medical Liquid Injection Operation-Third Mode>

When the plunger 230 is located at the position P-2 and the connector member 250 is located at the second position P2, the first contact terminal 911 and the second contact terminal 912 are electrically separated from the first sensor unit 910. When the first sensor unit 910 is electrically released, a third mode may be activated in the control module 16.

In the third mode, the control module 16 may transmit an alarm signal indicating that the amount of the stored medical liquid corresponds to a second reference amount to the user through the user terminal 20, the controller 30, and/or the alarm unit 800. The second reference amount may be defined as the amount of the medical liquid recognized by the driving module 300 when the third mode is driven. The control module 16 informs the user that the amount of the medical liquid remaining in the reservoir 210 is the preset second reference amount, so that the user can prepare to replace the medical liquid injection device 10.

In an embodiment, the first reference amount may be set as a medical liquid storage amount that is equal to the second reference amount. When the plunger 230 moves forward or backward and thus the connector member 250 is brought into contact with the second contact terminal 912 or released from the contact with the second contact terminal 912, the first reference amount and the second reference amount may be set to be the same since the position of the plunger 230 in the reservoir 210 is the same.

In another embodiment, the first reference amount may be set as a medical liquid storage amount greater than the second reference amount. The first reference amount is a reference value set for driving the first mode, and may be set to be substantially the same as the amount of the medical liquid stored in the reservoir 210. The second reference amount is the amount of the medical liquid recognized by the driving module 300 when the third mode starts, and may have a margin by being set to be less than the amount of the medical liquid actually remaining in the reservoir 210.

Since the second reference amount is set to be less than the amount of the medical liquid actually stored in the reservoir 210, the reservoir 210 has a margin corresponding to a difference between the actual remaining amount of the medical liquid and the second reference amount. Even when the medical liquid injection device 10 informs that there is no medical liquid, the medical liquid remaining in the reservoir 210 may be further used, so that a sudden disconnection or accident of the medical liquid may be eliminated, thereby improving the safety of the medical liquid injection device 10.

Since the remaining amount of the medical liquid is important in the third mode, the control module 16 may very precisely calculate the injection amount of the medical liquid and the remaining amount of the medical liquid in the reservoir 210 in the third mode. When the mode is the third mode, the control module 16 may accurately measure the rotation angle of the driving wheel 420 and the movement distance of the plunger 230 on the basis of the data obtained by the second sensor unit 920 and the encoder unit 930, so that the amount of the medical liquid discharged from the reservoir 210 and the amount of the medical liquid remaining in the reservoir 210 may be accurately calculated. The remaining amount of the medical liquid accurately calculated in the third mode is transmitted to the user in real time so that the user may recognize a risk.

In an embodiment, the medical liquid injection device 10 may accurately counting the amount of the medical liquid remaining in the reservoir 210 only in the third mode. In the second mode, the amount of the medical liquid present in the reservoir 210 is not precisely counted since the amount of the medical liquid stored in the reservoir 210 exceeds a preset range that is, the second reference amount, but in the third mode, the amount of the medical liquid stored in the reservoir 210 may be counted in a set amount. Since the storage amount of the medical liquid is precisely counted only when the amount of the medical liquid stored in the medical liquid injection device 10 reaches a level requiring an alarm, a control load of the medical liquid injection device 10 may be reduced.

The medical liquid injection device 10 according to an embodiment of the present disclosure may measure an injection amount of the medical liquid stored in the reservoir 210. The driving of the medical liquid injection device 10 may be set by measuring the amount of the medical liquid stored in the reservoir 210 by the first sensor unit 910. When the plunger 230 linearly moves inside the reservoir 210, the connector member 250 connected to the plunger 230 also moves together therewith to come into contact with the first sensor unit 910 or to release the contact with the first sensor unit 910, so that the amount of the medical liquid stored in the reservoir 210 may be sensed.

The medical liquid injection device 10 according to an embodiment of the present disclosure is preheated when the reservoir is filled with the medical liquid to a certain extent, thereby increasing driving efficiency. When the amount of the medical liquid injected into the reservoir 210 is sensed to be greater than or equal to the first reference amount by the first sensor unit 910, the medical liquid injection device 10 may prepare to drive some components as in the first mode and inject the medical liquid immediately when the medical liquid injection device 10 is attached to the user.

When the medical liquid stored in the reservoir 210 falls below a predetermined range, this is sensed by the medical liquid injection device 10 according to an embodiment of the present disclosure and informed to the user. When the first sensor unit 910 senses that the amount of the medical liquid stored in the reservoir 210 is less than or equal to the second reference amount, the medical liquid injection device 10 may drive the second sensor unit 920 and/or the encoder unit 930 to precisely count the amount of the medical liquid remaining in the reservoir 210 and transmit information on the counted amount to the user.

Figure 14:
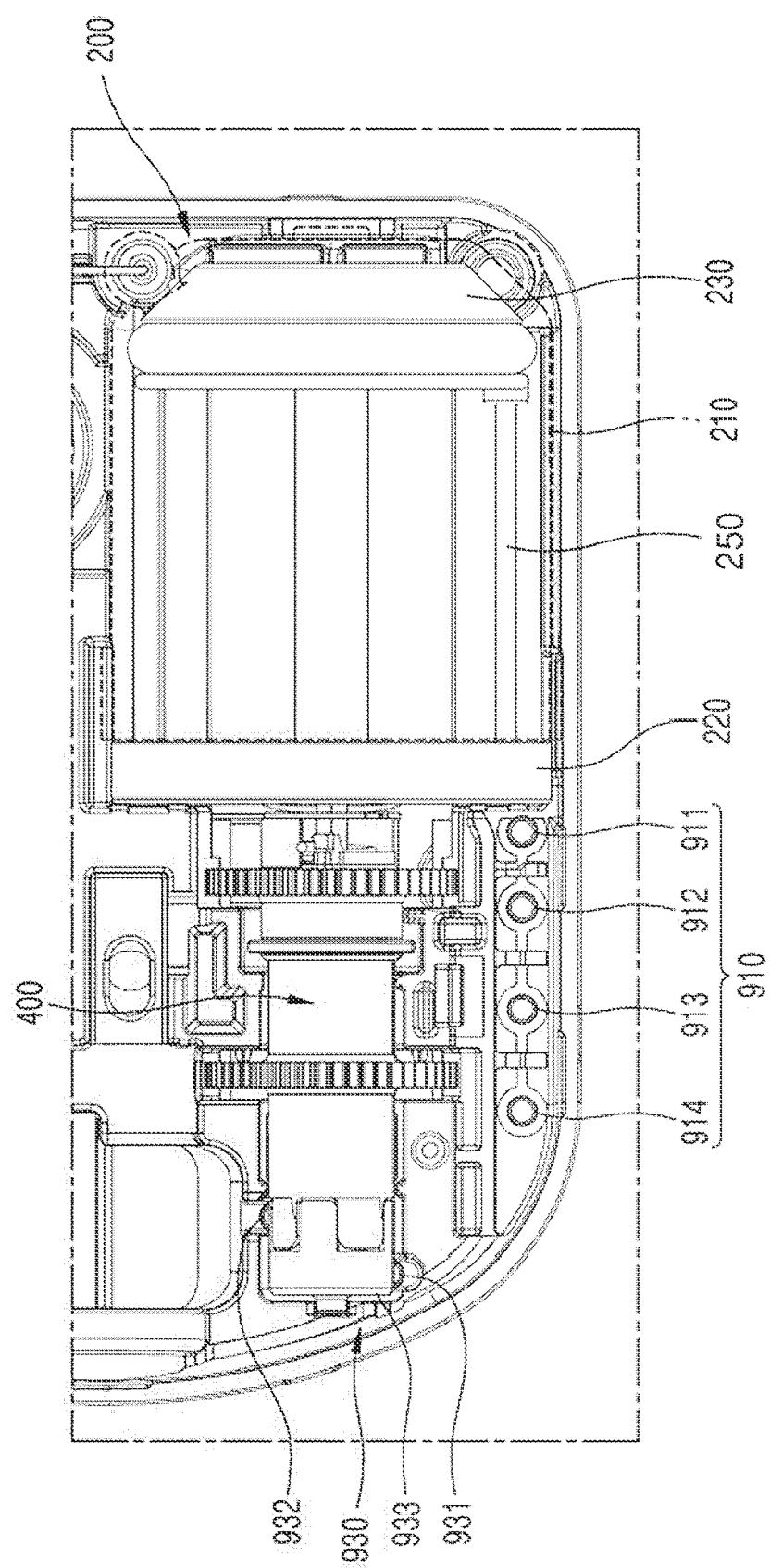
FIG. 14 is a plan view illustrating a portion of a medical liquid injection device according to another embodiment of the present disclosure.

FIG. 14 is a plan view illustrating a portion of a medical liquid injection device according to another embodiment of the present disclosure.

Referring to FIG. 14, a medical liquid injection device 10 may include a first sensor unit 910 having a plurality of contact terminals. In the drawing, the first sensor unit 910 is illustrated as having four contact terminals, but is not limited thereto, and may be set to have various numbers of contact terminals.

The first sensor unit 910 may include a first contact terminal 911, a second contact terminal 912, a third contact terminal 913, and a fourth contact terminal 914.

The first to fourth contact terminals 911 to 914 may be disposed to be adjacent to each other. A connector member 250 comes into contact with at least one of the first to fourth contact terminals 911 to 914 to sense an amount of a medical liquid stored in a reservoir 210.

In an embodiment, when the connector member 250 is electrically connected to the first contact terminal 911 and the second contact terminal 912, an electrical signal is sensed by the first sensor unit 910, and it is estimated that the medical liquid as much as A is stored in the reservoir 210. When the connector member 250 is electrically connected to the third contact terminal 913 and the fourth contact terminal 914, the first sensor unit 910 senses an electrical signal, and it is estimated that the medical liquid as much as B greater than A is stored in the reservoir 210.

In another embodiment, when the connector member 250 comes into contact with the first contact terminal 911, the first sensor unit 910 senses an electrical signal, and it is estimated that the medical liquid as much as A' is stored in the reservoir 210.

When the connector member 250 comes into contact with the second contact terminal 912, the third contact terminal 913, and the fourth contact terminal 914, the first sensor unit 910, it is estimated that the medical liquids as much as B', C', and D' are stored in the reservoir 210, respectively.

In an embodiment, the first to fourth contact terminals 911 to 914 may be disposed at the same interval.

In another embodiment, intervals between the first to fourth contact terminals 911 to 914 may be set to be different from each other. The interval between the first contact terminal 911 and the second contact terminal 912, the interval between the second contact terminal 912 and the third contact terminal 913, and the interval between the third contact terminal 913 and the fourth contact terminal 914 may be set differently, or at least one thereof may be differently set, so that the amount of the medical liquid stored in the reservoir 210 may be variously sensed.

Figure 15:
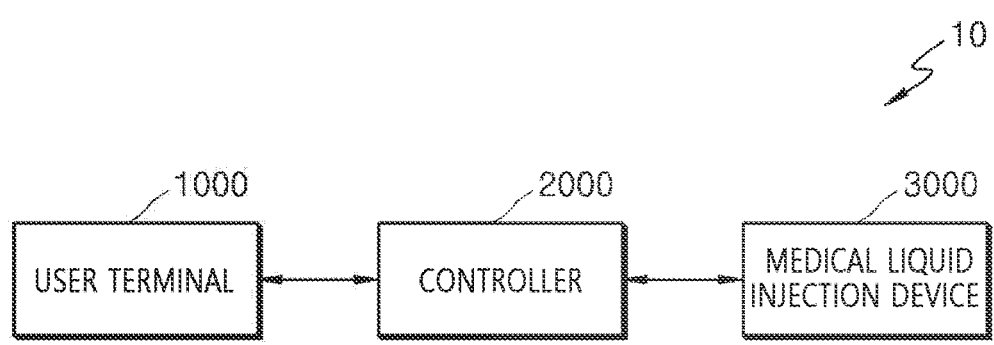
FIG. 15 is a block diagram of an insulin management system including user terminals, a controller, and a medical liquid injection device.

FIG. 15 is a block diagram of an insulin management system including user terminals, a controller, and a medical liquid injection device.

User terminals 1000 refer to communication terminals capable of using a web service in a wired/wireless communication environment. For example, the user terminal 1000 may be a smartphone, a tablet personal computer (PC), a PC, a smart television (TV), a mobile phone, a personal digital assistant (PDA), a laptop computer, a media player, a micro-server, a global positioning system (GPS) device, an electronic book terminal, a digital broadcasting terminal, a navigation device, a kiosk, an MP3 player, a digital camera, a home appliance, a device equipped with a camera, or another mobile or non-mobile computing device. In addition, the user terminal 1000 be a wearable device, such as a watch, glasses, a hairband, or a ring, having a communication function and a data processing function However, a terminal equipped with an application capable of Internet communication as described above may be unlimitedly employed.

The user terminal 1000 may be connected to a pre-registered controller 2000 on a one-to-one basis. In addition, the user terminals 1000 may receive data from the controller 2000 in order to prevent control from an external device. The user terminal 1000 may transmit setting information, for example, system time information, to the controller 2000 within a preset range.

The controller 2000 performs a function of transmitting and receiving data to and from a medical liquid injection device 3000, and may transmit a control signal related to injection of medical liquid such as insulin to the medical liquid injection device 3000, and receive a control signal related to the measurement of a biometric value such as blood sugar level from the medical liquid injection device 3000.

The controller 2000 may transmit an instruction request for measuring a current state of a user to the medical liquid injection device 3000, and receive measurement data from the medical liquid injection device 3000 in response to the instruction request.

Here, the medical liquid injection device 3000 performs a function of measuring the biometric value such as user's blood sugar value, blood pressure, heart rate, or the like, but also performs a function of injecting a medical liquid such as insulin, glucagon, anesthetic, pain killer, dopamine, growth hormone, non-smoking aids, or the like to be injected to the user.

The medical liquid injection device 3000 may further include a storage unit for storing a substance that is to be periodically injected to the user, and an injection amount that is to be injected from the storage unit may be controlled according to an injection signal generated by the controller.

Here, the medical liquid injection device 3000 may transmit information such as a measurement value and an injection amount to the controller 2000. Selectively, the medical liquid injection device 3000 may transfer a device state message, a biometric value measurement message, a medical liquid injection message, a remaining amount value of the medical liquid in the storage unit, or the like to the controller 2000. For example, the medical liquid injection device 3000 may transmit a device state message including information on a remaining battery capacity of the device, whether the device is booted successfully, whether the injection is successful, or the like to the controller 2000. Messages transmitted to the controller 2000 may be transmitted to the user terminal 1000 via the controller. Alternatively, the controller 2000 may transmit improved data obtained by processing the received messages to the user terminal 1000.

The medical liquid injection device 3000 may also be implemented to be communicatable with only a previously registered controller 2000. In addition, the medical liquid injection device 3000 may be divided into a measurement device for performing a function of measuring a biometric value such as user's blood sugar value, blood pressure, heart rate, or the like and an injection device for performing a function of injecting a medical liquid such as insulin, glucagon, anesthetic, or the like. That is, the measurement device and the injection device may be independently present. The controller 2000 may be connected to each of the injection device and the measurement device to generate and provide a control signal with respect to the injection device on the basis of a measurement value measured by the measurement device.

In an embodiment, the medical liquid injection device 3000 may transmit a remaining amount value of the medical liquid in the storage unit to the controller 2000. The controller 2000 may provide the remaining amount value of the storage unit to the user.

In an embodiment, the medical liquid injection device 3000 may transmit a contact detection signal or a non-contact detection signal between a connector member and a sensor unit to the controller 2000. The controller 2000 may notify the user that the medical liquid injection device 3000 is switched from a deactivation mode to an activation mode in response to receiving the contact detection signal.

The controller 2000 may provide a remaining amount value of the storage unit to the user in response to receiving the non-contact detection signal.

In addition, the controller 2000 may calculate the remaining amount value of the storage unit on the basis of a remaining amount value of the storage unit when the non-contact detection signal is initially received, a discharge amount when the medical liquid is discharged once, and a count value of the non-contact detection signal, and provide the calculated remaining amount value of the storage unit to the user.

Various pieces of information provided by the controller 2000 may also be provided through the user terminal 1000.

Meanwhile, the user terminal 1000, the controller 2000, and the medical liquid injection device 3000 may perform communication by using a network. For example, the network may include a local area network (LAN), a wide area network (WAN), a value-added network (VAN), a mobile radio communication network, a satellite communication network, or a combination thereof. The network is a data communication network in a comprehensive sense that enables network components to communicate with each other smoothly, and may include a wired Internet, a wireless Internet, or a mobile wireless communication network. In addition, wireless communication may include, for example, wireless LAN (Wi-Fi), Bluetooth, Bluetooth low energy (BLE), Zigbee, Wi-Fi direct (WFD), ultra-wideband (UWB), infrared data association (IrDA), near field communication (NFC), or the like, but the present disclosure is not limited thereto.

Figure 16:
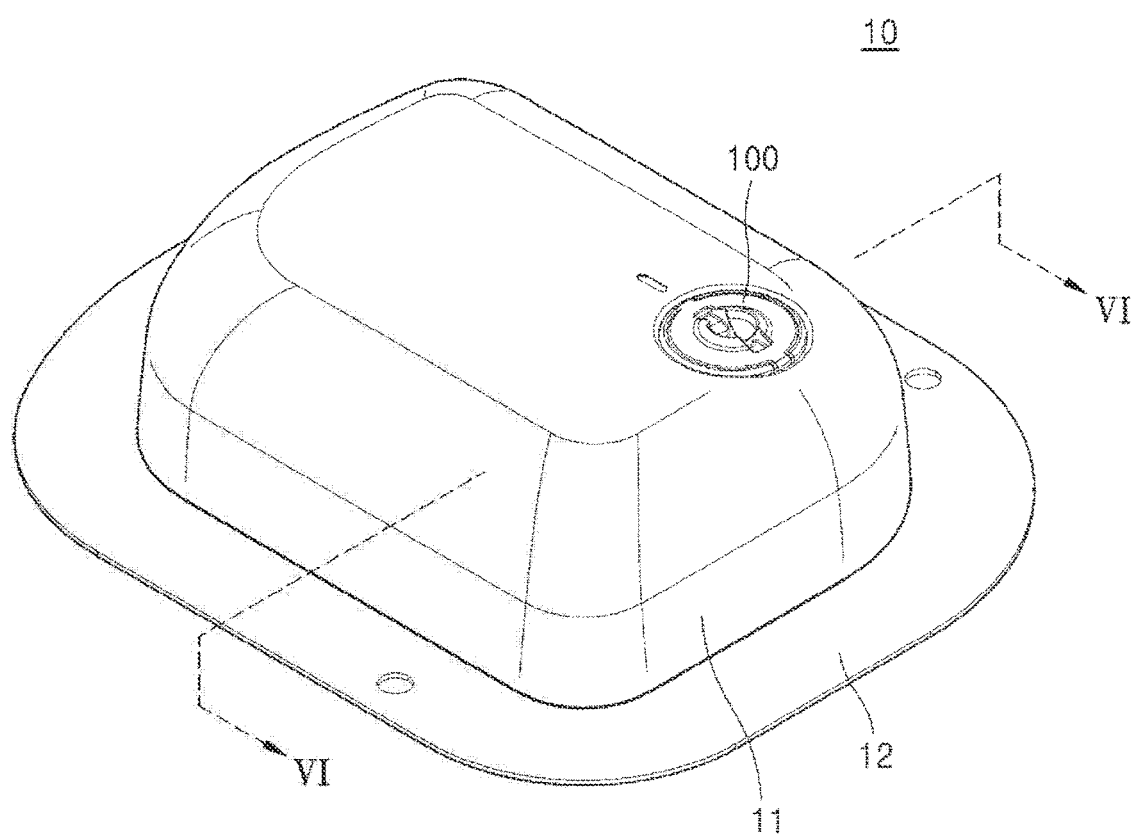
FIG. 16 is a perspective view illustrating a medical liquid injection device according to an embodiment.
Figure 17:
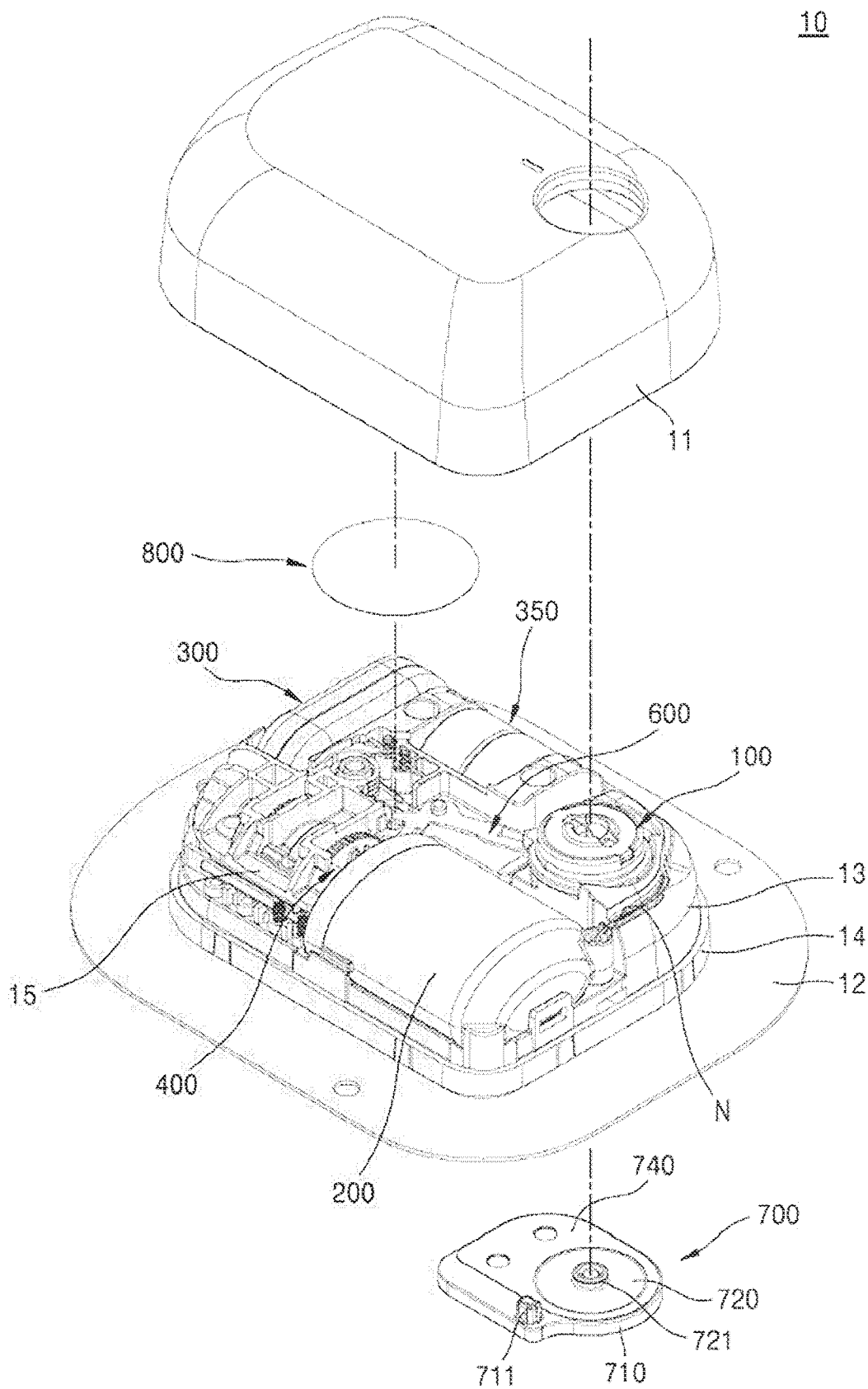
FIG. 17 is an exploded perspective view of the medical liquid injection device according to an embodiment.
Figure 18:
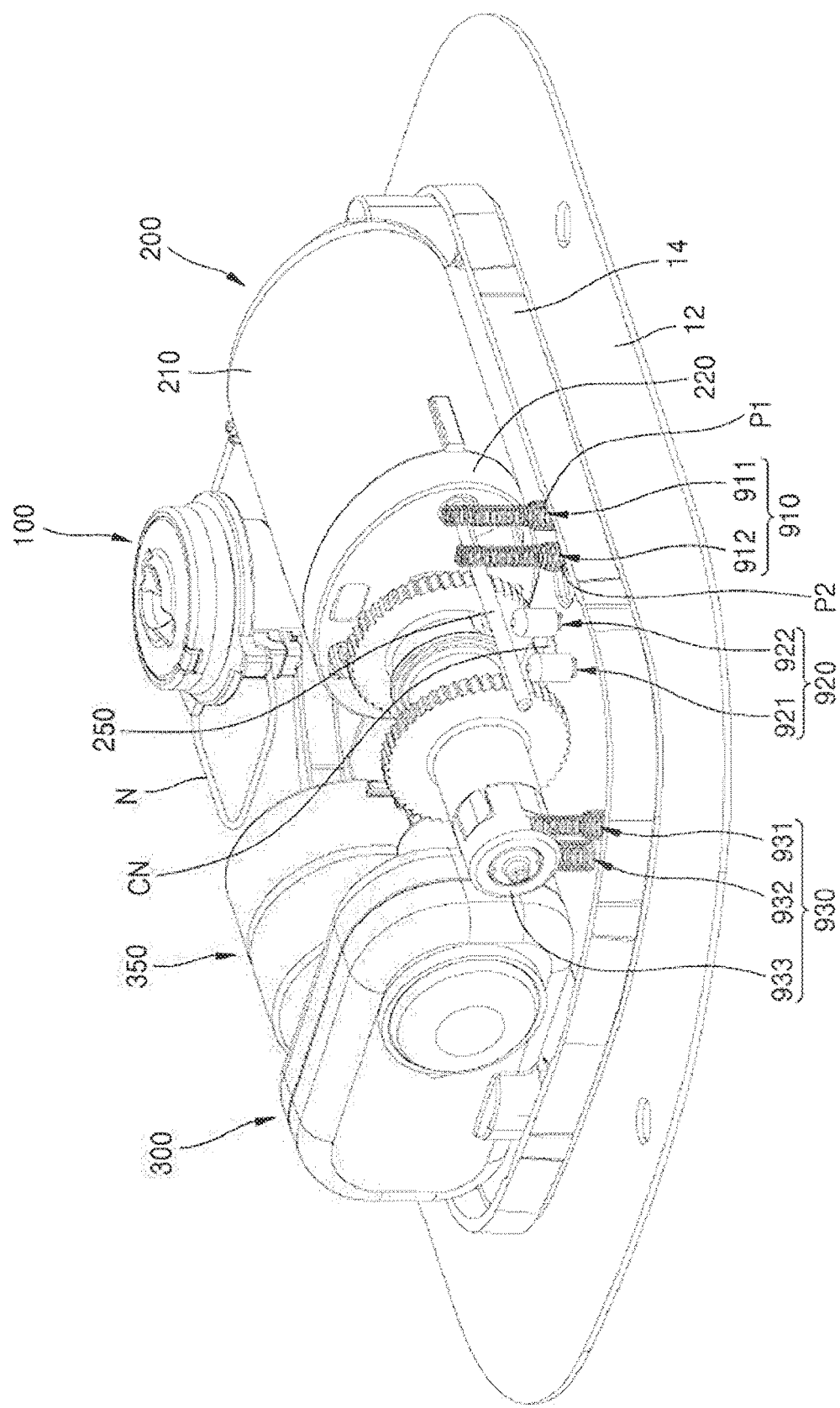
FIG. 18 is a perspective view illustrating a partial configuration of FIG. 17.
Figure 19:
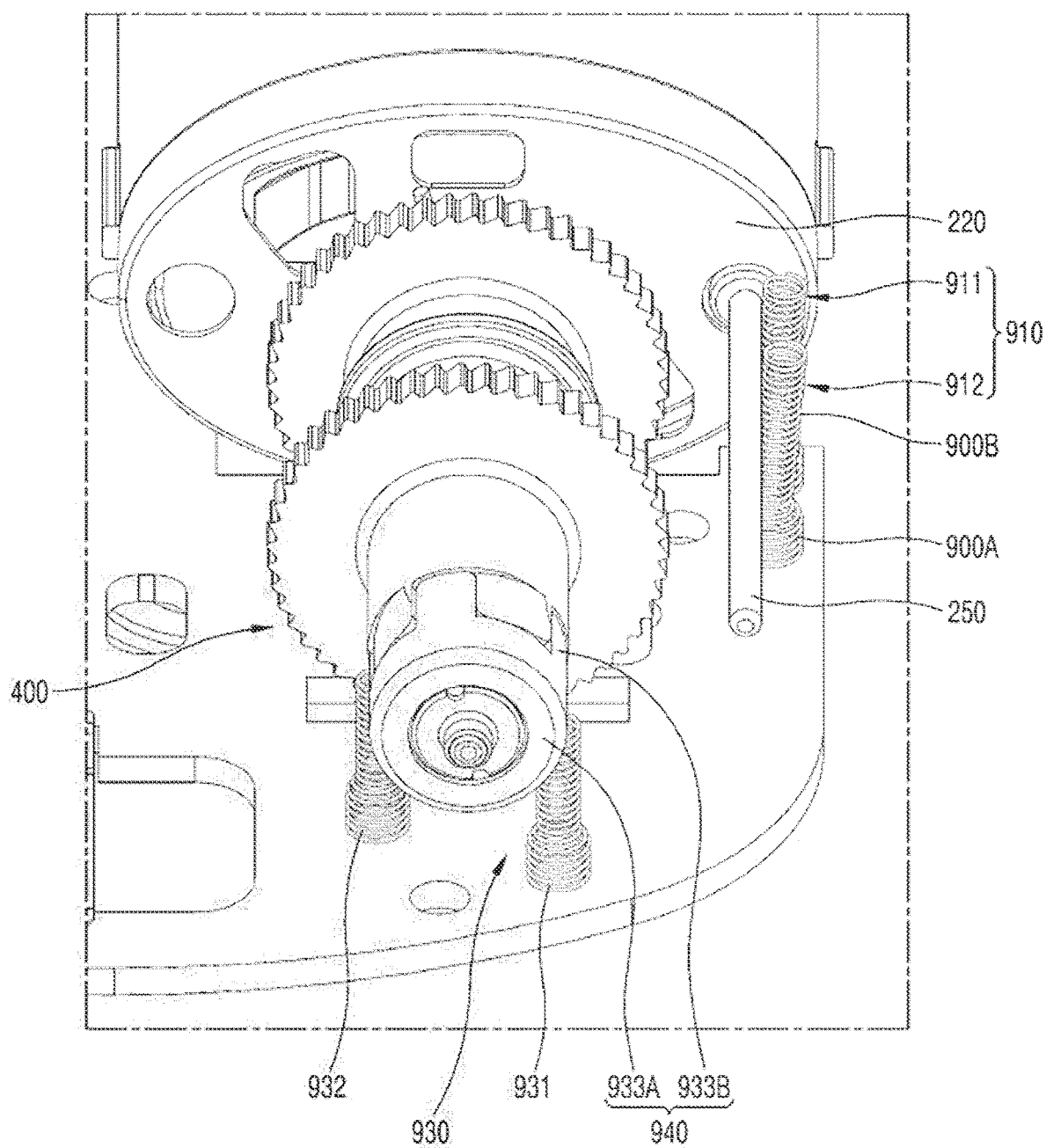
FIG. 19 is a perspective view illustrating one side of FIG. 18.
Figure 20:
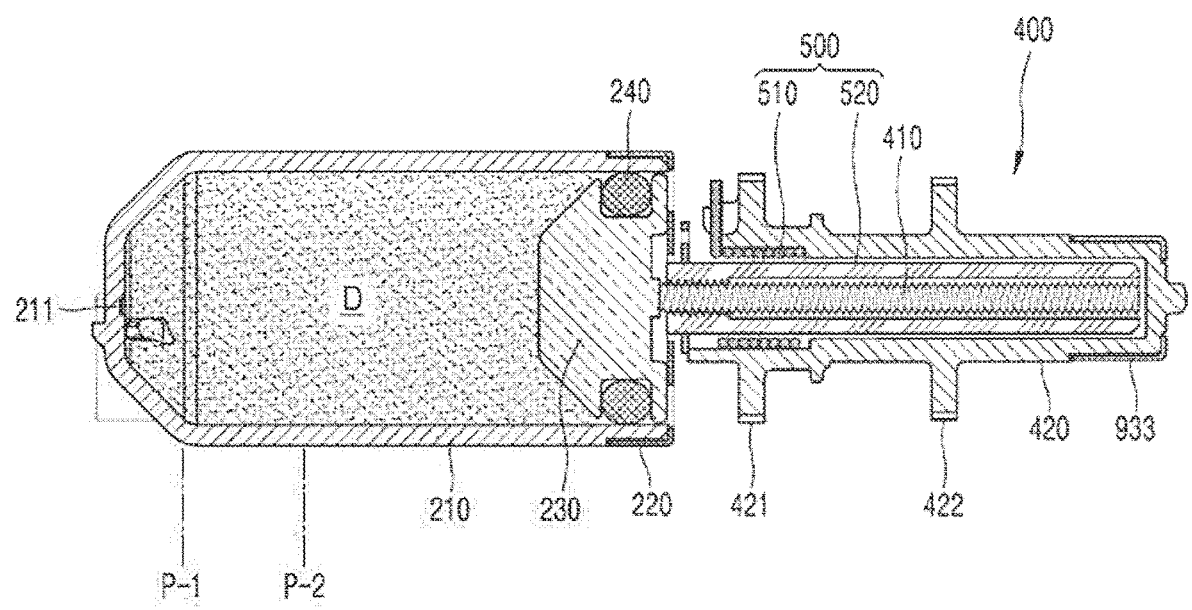
FIG. 20 is a plan view illustrating driving for sensing a flow rate of a storage unit.

FIG. 16 is a perspective view illustrating a medical liquid injection device according to an embodiment, FIG. 17 is an exploded perspective view of the medical liquid injection device according to an embodiment, FIG. 18 is a perspective view illustrating a partial configuration of FIG. 17, and FIG. 19 is a perspective view illustrating one side of FIG. 18. In addition, FIG. 20 is a plan view illustrating driving for sensing a flow rate of a storage unit.

Referring to FIGS. 16 to 20, a medical liquid injection device 10 may be attached to a user into which a medical liquid is injected, and may inject a medical liquid stored therein to the user in a set amount.

The medical liquid injection device 10 may be used for various purposes depending on the type of medical liquid to be injected. For example, the medical liquid may include an insulin-based medical liquid for a diabetic patient, and may include a medical liquid for other pancreas, a medical liquid for heart, and other various types of medical liquids.

One embodiment of the medical liquid injection device 10 may include a housing 11 for covering an outside and an attachment portion 12 located adjacent to the user's skin. The medical liquid injection device 10 includes a plurality of components disposed in an inner space between the housing 11 and the attachment portion 12. A separate bonding means may be further interposed between the attachment portion 12 and the user's skin, and the medical liquid injection device 10 may be fixed to the skin by the bonding means.

The medical liquid injection device 10 may include a needle assembly 100, a storage unit 200, a driving module 300, a battery 350, a driving unit 400, a clutch unit 500, a trigger member 600, a needle cover assembly 700, an alarm unit 800, and a plurality of sensor units.

The medical liquid injection device 10 may include a base body that forms a frame and is composed of one or more bodies configured to support the internal components. The base body may include a first body 13, a second body 14, and a third body 15 according to the arrangement.

The first body 13 is disposed below the housing 11, and the needle assembly 100, the storage unit 200, the driving module 300, the battery 350, and the like may be supported in respective openings or grooves. The second body 14 is disposed below the first body 13 and may be connected to the attachment portion 12. The second body 14 may cover a lower portion of the medical liquid injection device 10. The third body 15 is disposed above the first body 13, and the storage unit 200, the driving module 300, the battery 350, the driving unit 400, and the like may be supported in respective openings or grooves. The first body 13, the second body 14, and the third body 15 are illustrated in the drawings, but are not limited thereto, and may be provided as a single body or a plurality of bodies.

A control module (not shown) may be disposed inside the medical liquid injection device 10. The control module (not shown), which is a circuit board, may be disposed below the second body 14, and may control the overall driving of the medical liquid injection device 10. The control module (not shown) may control the driving of each of the driving module 300, the battery 350, the alarm unit 800, and the plurality of sensor units by electrically coming into contact therewith.

The needle assembly 100 may be mounted on the first body 13. In the needle assembly 100, a needle N and/or a cannula may be moved in an axial direction as a sleeve 110 rotates.

One end of the needle N may be connected to the storage unit 200 so that a medical liquid may be transmitted therethrough, and the other end thereof may be inserted into the cannula and may move along the cannula.

The cannula has a tube shape capable of receiving the needle N, so that the medical liquid discharged from the needle N may be injected into a user.

The cannula maintains a state of being inserted into the user's skin, but the needle N is lifted and separated from the object. However, the cannula and the needle N form a path through which a fluid moves, so that the medical liquid injected from the storage unit 200 may be injected to the user through the needle N and the cannula.

The medical liquid injection device 10 may insert the cannula into an object and start a medical liquid injection as a user simply rotates the needle assembly 100.

The storage unit 200 is mounted on the first body 13 and the third body 15 and is connected to the needle assembly 100. The storage unit 200 may store a medical liquid in an inner space thereof and move the medical liquid in a set amount into the needle N by moving a plunger 230. The storage unit 200 may include a storage space 210, a cap cover 220, the plunger 230, a sealing ring 240, and a connector member 250.

The storage space 210 extends in a longitudinal direction and may store a medical liquid in the inner space. As the plunger 230 moves, the medical liquid stored in the storage space 210 may be discharged to the needle N. The cap cover 220 may be mounted on an end portion of the storage space 210.

The storage space 210 may include an inlet end and an outlet end. A medical liquid may be injected into the inlet end and may be discharged through the needle N installed at the outlet end.

The plunger 230 is disposed inside the storage unit 200 to seal the storage space 210, and may linearly move in a longitudinal direction of the storage unit 200 by the driving of the driving module 300 and the driving unit 400. When the medical liquid is replenished in the storage unit 200, the plunger 230 may move backward, and when the medical liquid is discharged from the storage unit 200, the plunger 230 may move forward. In an embodiment, a mechanical configuration that prevents medical liquid replenishment may be added to the medical liquid injection device 10, which will be described later in a part related to the coupler 510.

The connector member 250 may be attached to one side of the plunger 230. The connector member 250 is attached to the plunger 230, and may linearly move together with the plunger 230 as the plunger 230 linearly moves.

When the plunger 230 moves backward, the connector member 250 may be moved backward together with the plunger 230, and when the plunger 230 moves forward, the connector member 250 may be moved forward together with the plunger 230.

The connector member 250 may be formed of a material having electrical conductivity and may have a shaft shape. As the connector member 250 comes into contact with a sensor unit 910 while moving, a medical liquid storage amount may be measured, and the driving of the medical liquid injection device 10 may be started.

The driving module 300 may generate a driving force and transmit the driving force to the driving unit 400. The driving force transmitted by the driving unit 400 moves the plunger 230 along the longitudinal direction of the storage unit 200, and in this process, the medical liquid may be discharged.

The driving unit 400 is installed between the driving module 300 and the storage unit 200, and may move the plunger 230 disposed in the storage unit 200 by the driving force generated by the driving module 300. However, the driving unit 400 may move the plunger 230 forward only when the rod 410 and the driving wheel 420 are coupled or connected by the clutch unit 500.

The rod 410 is connected to the plunger 230 and extends in one direction. The rod 410 may be inserted into the opening of the cap cover 220, and the rod 410 may move in the longitudinal direction of the storage unit 200 in order to move the plunger 230. The rod 410 may have a screw thread shape on a surface thereof. The rod 410 is inserted into the connection member 520, and when a medical liquid in a set amount is discharged, the rod 410 may be connected to the driving wheel 420 by the clutch unit 500 and may move forward.

The driving wheel 420 is drivingly connected to the driving module 300, and may be rotated by the driving of the driving module 300. The driving wheel 420 includes a first connection terminal 421 and a second connection terminal 422, and may have a space therein in which the rod 410 may move. At least one of the first connection terminal 421 and the second connection terminal 422 is always drivingly connected to the driving module 300 by a connector CN, and thus the driving wheel 420 may be rotated by the driving of the driving module 300.

When parts in the driving unit 400 are engaged to each other by the clutch unit 500, the driving module 300 rotates the driving wheel 420 of the driving unit 400, and the rotational movement of the driving wheel 420 may lead to a linear movement of the plunger 230. When the plunger 230 linearly moves, the connector member 250 attached to one side of the plunger 230 may also linearly move together therewith.

The clutch unit 500 may drivingly connect the driving module 300 and the driving unit 400. The clutch unit 500 is disposed between the rod 410 and the driving wheel 420, and may include the coupler 510 and the connection member 520.

The coupler 510 is disposed outside the connection member 520 and spaced apart a predetermined distance from the connection member 520, and may connect the rod 410 and the driving wheel 420 when deactivated. The coupler 510 may be a component capable of pressing an outside of the connection member 520 with an elastic force.

In an embodiment, when a medical liquid is replenished in the storage unit 200, the plunger 230 and the connection member 520 connected to the plunger 230 may move backward along the longitudinal direction of the storage unit 200, and in this process, the connection member 520 and the coupler 510 may be fastened. After the connection member 520 and the coupler 510 are fastened, the plunger 230 may not move backward any further so that additional replenishment of the medical liquid may be impossible. That is, after the connection member 520 and the coupler 510 are fastened, the plunger 230 can only move forward.

All types of devices having a medical liquid suction force and a medical liquid discharge force by electricity may be used as the driving module 300. For example, all types of pumps such as a mechanical displacement type micropump and an electromagnetic motion type micropump may be used. The mechanical displacement type micropump is a pump that uses solid or fluid motion such as a gear or diaphragm to generate a pressure difference to induce fluid flow, and includes a diaphragm displacement pump, a fluid displacement pump, a rotary pump, and the like. The electromagnetic motion micropump is a pump that directly uses electrical or magnetic energy for fluid movement, and may include an electro-hydrodynamic pump (EHD), an electro-osmotic pump, a magneto-hydrodynamic pump, an electrowetting pump, and the like.

The battery 350 may activate each component by supplying electricity to the medical liquid injection device 10. A pair of batteries 350 are illustrated in the drawing, but the present disclosure is not limited thereto, and the battery 500 may be set in various ways according to the capacity, usage range, usage time, and the like of the medical liquid injection device 10.

The battery 350 is disposed adjacent to the driving unit 400, and may supply electricity to the driving unit 400. In addition, the battery 350 is connected to the control module 16, and data on a rotation number or speed of the driving unit 400, an amount of the medical liquid stored in the storage unit 200, and an amount of the medical liquid injected into a user may be measured on the basis of an electrical signal measured by the sensor unit.

Figure 21:
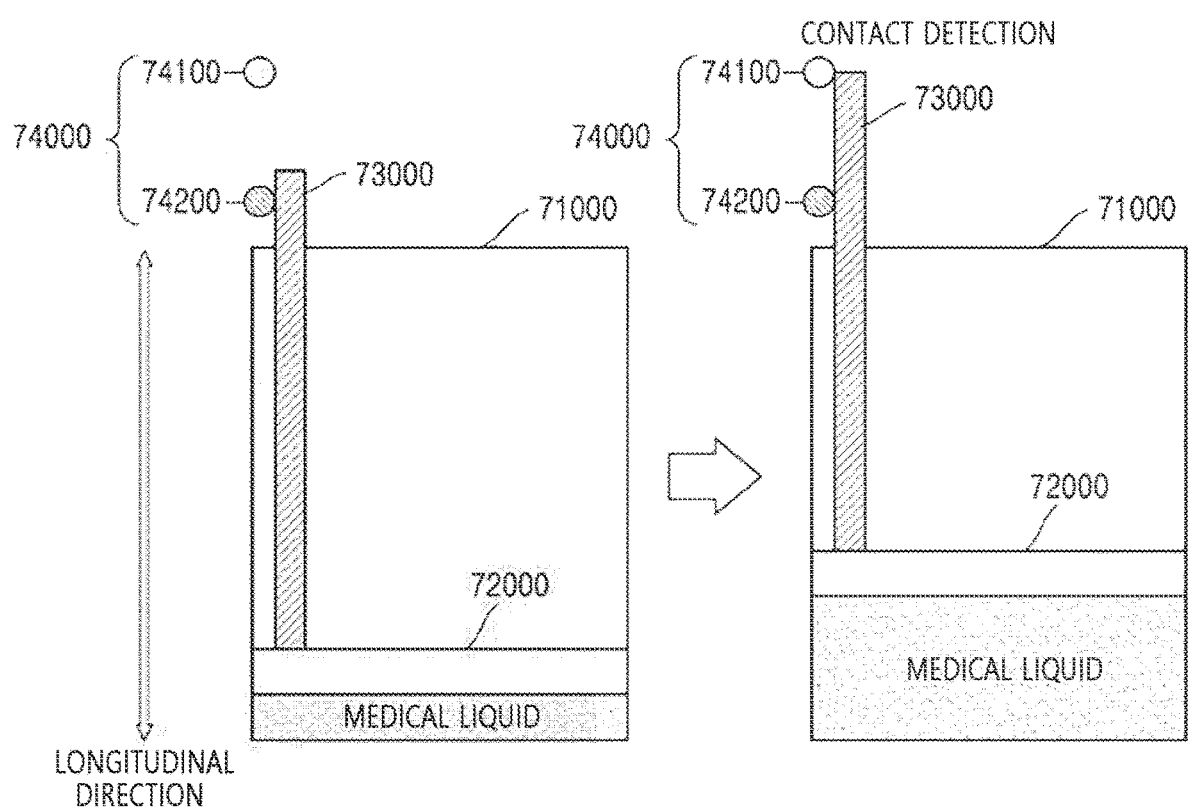
FIG. 21 is a view for describing an example in which a sensor unit detects a contact of a connector member according to an embodiment.

FIG. 21 is a view for describing an example in which a sensor unit detects a contact of a connector member according to an embodiment.

Referring to FIG. 21, a medical liquid may be stored in a storage unit 71000. A plunger 72000 may seal a space in which the medical liquid of the storage unit 71000 is stored. When the medical liquid is replenished in the storage unit 71000 or discharged from the storage unit 71000, the plunger 72000 may move along a longitudinal direction of the storage unit 71000.

When a medical liquid is replenished in the storage unit 71000, the plunger 72000 may move in an outward direction of the storage unit 71000, and when the medical liquid is discharged from the storage unit 71000, the plunger 72000 may move in an inward direction of the storage unit 71000.

A connector member 73000 may be attached to one side of the plunger 72000. The connector member 73000 may move together with the plunger 72000. When a medical liquid is replenished in the storage unit 71000, the connector member 73000 may also move in the outward direction of the storage unit 71000, and when the medical liquid is discharged from the storage unit 71000, the plunger 72000 may move in the inward direction of the storage unit 71000.

A sensor unit 74000 may be disposed adjacent to the storage unit 71000. The sensor unit 74000 may include a first contact terminal 74100 and a second contact terminal 74200.

A processor may receive a contact detection signal or a non-contact detection signal from the sensor unit 74000.

In an embodiment, the connector member 73000 may be in a state of maintaining the contact with the second contact terminal 74200. When the connector member 73000 is in contact with only the second contact terminal 74200, the processor may receive a non-contact detection signal from the sensor unit 74000. Specifically, the processor may cause current to periodically flow from a battery to the sensor unit 74000, and determine that the non-contact detection signal is received when a feedback signal is not received from the sensor unit 74000. The feedback signal may be a current value, but the present disclosure is not limited thereto.

The connector member 73000 in contact with only the second contact terminal 74200 may come into contact with both the first contact terminal 74100 and the second contact terminal 74200 while moving along a longitudinal direction of the storage unit 71000. At this time, the processor may receive the contact detection signal from the sensor unit 74000. That is, when the connector member 73000 is in contact with the second contact terminal 74200 while maintaining the contact with the first contact terminal 74100, the processor may receive the contact detection signal from the sensor unit 74000. Specifically, the processor may cause current to periodically flow from the battery to the sensor unit 74000, and determine that the contact detection signal is received when the feedback signal is received from the sensor unit 74000.

In an embodiment, when the contact detection signal is received from the sensor unit 74000, the processor may switch from a deactivation mode of the medical liquid injection device to an activation mode thereof. That is, when the connector member 73000 is in contact with only the first contact terminal 74100, the medical liquid injection device operates in the deactivation mode, and from when the connector member 73000 comes into contact with both the first contact terminal 74100 and the second contact terminal 74200, the medical liquid injection device may operate in the activation mode.

In the deactivation mode of the medical liquid injection device, power may not be supplied to at least some components inside the medical liquid injection device. In the activation mode of the medical liquid injection device, power may be supplied to the components to which the power is not supplied in the deactivation mode.

When a description is made with reference to FIGS. 17 to 20, in the deactivation mode, power may not be supplied to the driving unit 400 of the medical liquid injection device 10. In order to discharge a medical liquid stored in the storage unit 200, a driving force of the driving unit 400 is required, and in the deactivation mode, since power is not supplied to the driving unit 400, the medical liquid stored in the storage unit 200 is not injected to a user. On the other hand, in the activation mode, power is supplied to the driving unit 400 of the medical liquid injection device 10, and thus the medical liquid stored in the storage unit 200 may be injected to the user.

Figure 22A:
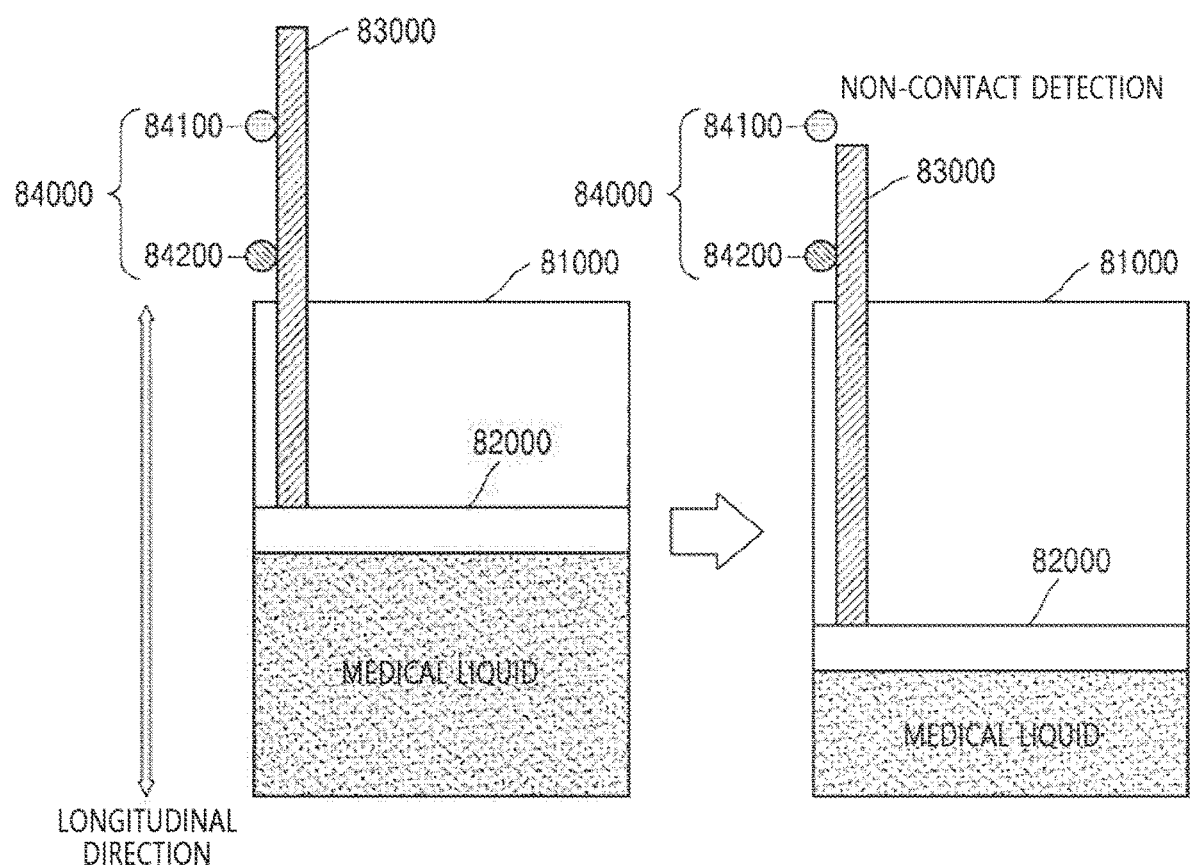

FIGS. 22A and 22B are views for describing an example in which a sensor unit detects a non-contact of a connector member according to an embodiment.

Hereinafter, repeated descriptions with respect to FIG. 21 will be omitted for convenience.

Referring to FIG. 22A, a sensor unit 84000 may be disposed adjacent to a storage unit 81000. The sensor unit 84000 may include a first contact terminal 84100 and a second contact terminal 84200.

A processor may receive a contact detection signal or a non-contact detection signal from the sensor unit 84000.

In an embodiment, a connector member 83000 may be in a state of maintaining the contact with the first contact terminal 84100 and the second contact terminal 84200. When the connector member 83000 is in contact with both the first contact terminal 84100 and the second contact terminal 84200, the processor may receive the contact detection signal from the sensor unit 84000. Specifically, the processor may cause current to periodically flow from a battery to the sensor unit 84000, and determine that the contact detection signal is received when a feedback signal is received from the sensor unit 84000. The feedback signal may be a current value, but the present disclosure is not limited thereto.

The connector member 83000 in contact with both the first contact terminal 84100 and the second contact terminal 84200 may be released from the contact with the second contact terminal 84200 while moving in a longitudinal direction of the storage unit 81000. At this time, the processor may receive the non-contact detection signal from the sensor unit 84000. That is, when the connector member 83000 is released from the contact with the first contact terminal 84100 while maintaining the contact with the second contact terminal 84200, the processor may receive the non-contact detection signal from the sensor unit 84000. Specifically, the processor may cause current to periodically flow from the battery to the sensor unit 84000, and determine that the non-contact detection signal is received when the feedback signal is not received from the sensor unit 84000.

As the medical liquid of the storage unit 81000 is discharged, the connector member 83000 moves in an inward direction of the storage unit 81000, and in this process, the contact between the connector member 83000 and the first contact terminal 74100 may be released.

That is, when the non-contact detection signal is received while receiving the contact detection signal from the sensor unit 84000, the processor may determine a remaining amount value of the storage unit 81000 as a preset remaining amount value. For example, the preset remaining amount value may be 75%, 50%, 25%, 10%, or the like of the total capacity of the storage unit, but the present disclosure is not limited thereto.

Referring to FIG. 22B, the sensor unit 84000 may further include a third contact terminal 84300 in addition to the first contact terminal 84100 and the second contact terminal 84200.

In an embodiment, the connector member 83000 may be in a state of maintaining the contact with the first contact terminal 84100, the second contact terminal 84200, and the third contact terminal 84300. When the connector member 83000 is in contact with both the first contact terminal 84100, the second contact terminal 84200, and the third contact terminal 84300, the processor may receive a contact detection signal from the sensor unit 84000. Specifically, the processor may cause current to periodically flow from the battery to the sensor unit 84000, and determine that the contact detection signal is received when a feedback signal is received from the sensor unit 84000. The feedback signal may be a current value, but the present disclosure is not limited thereto.

The connector member 83000 in contact with both the first contact terminal 84100, the second contact terminal 84200, and the third contact terminal 84300 may be released from the contact with the third contact terminal 84300 while moving in the longitudinal direction of the storage unit 81000. At this time, the processor may receive a first non-contact detection signal from the sensor unit 84000. That is, when the connector member 83000 is released from the contact with the third contact terminal 84300 while maintaining the contact with the first contact terminal 84100 and the second contact terminal 84200, the processor may receive the first non-contact detection signal from the sensor unit 84000.

When the first non-contact detection signal is received from the sensor unit 84000, the processor may determine a remaining amount value of the storage unit 81000 as a first remaining amount value. For example, the first remaining amount value may be 50% of the total capacity of the storage unit.

After the contact with the third contact terminal 84300 is released, the connector member 83000 in contact with the first contact terminal 84100 and the second contact terminal 84200 may be released from the contact with the first contact terminal 84100 while moving in the longitudinal direction of the storage unit 81000. At this time, the processor may receive a second non-contact detection signal from the sensor unit 84000. That is, when the connector member 83000 is released from the contact with first contact terminal 84100 while maintaining the contact with the second contact terminal 84200, the processor may receive the second non-contact detection signal from the sensor unit 84000.

When the second non-contact detection signal is received from the sensor unit 84000, the processor may determine the remaining amount value of the storage unit 81000 as a second remaining amount value. For example, the second remaining amount value may be 25% of the total capacity of the storage unit.

In FIG. 22B, it is illustrated that the first to third contact terminals 84100, 84200, and 84300 are included in the sensor unit 84000, but the number of contact terminals included in the sensor unit 84000 is not limited thereto.

The sensor unit 84000 may include a plurality of contact terminals. The processor may differently determine the remaining amount value of the storage unit 81000 depending on the contact terminal, for which the non-contact detection signal is received from the sensor unit, among the plurality of contact terminals. That is, as the number of contact terminals included in the sensor unit 84000 increases, the processor may more precisely measure the remaining amount of the storage unit 81000.

Figure 23:
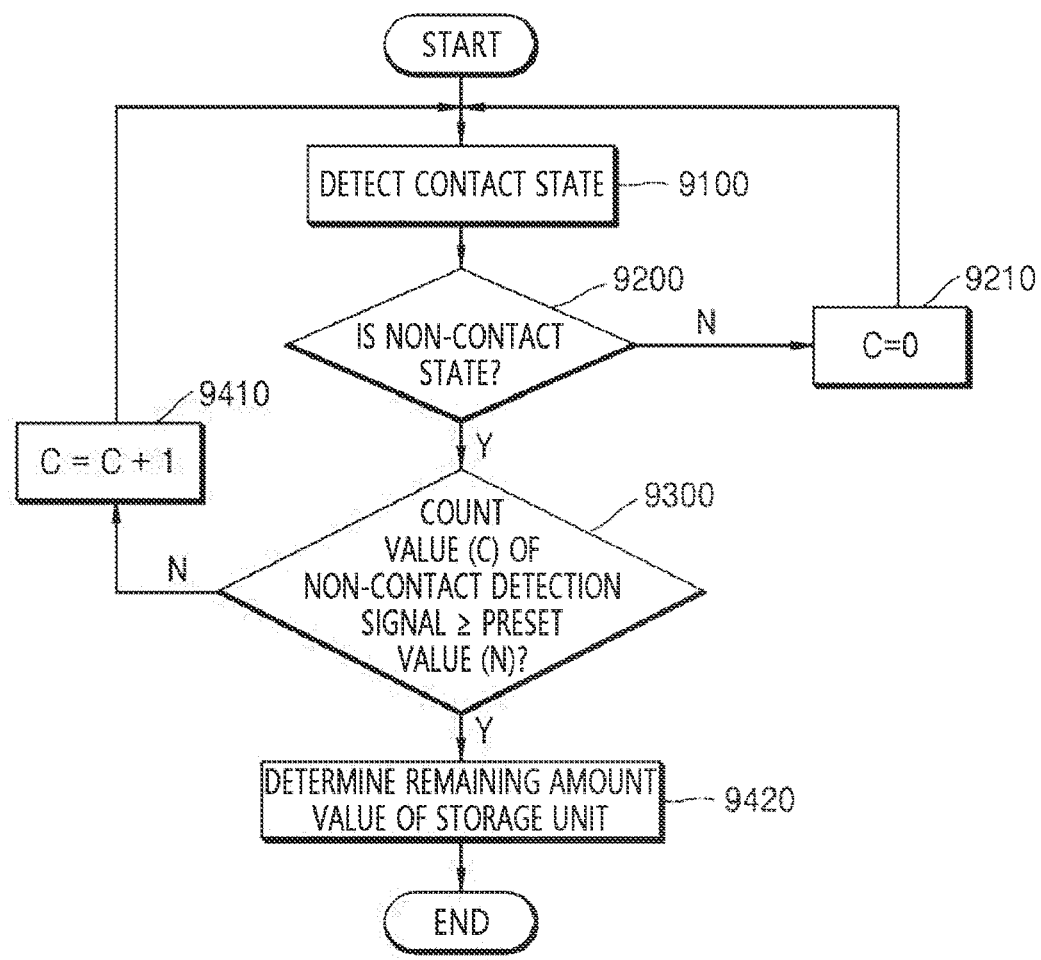
FIG. 23 is a flowchart illustrating a method of removing contact noise between a sensor unit and a connector member according to an embodiment.

FIG. 23 is a flowchart illustrating a method of removing contact noise between a sensor unit and a connector member according to an embodiment.

A medical liquid injection device may include a storage unit, a plunger, a connector member, a processor, and a sensor unit. A medical liquid may be stored in the storage unit. The plunger may seal the storage unit, and may move along a longitudinal direction of the storage unit as a medical liquid is replenished in the storage unit or discharged from the storage unit. The connector member may be attached to one side of the plunger. The processor may receive a contact detection signal or a non-contact detection signal from the sensor unit disposed adjacent to the storage unit. The connector member may be in contact with or not in contact with the sensor unit while moving together with the plunger.

Referring to FIG. 23, in operation 9100, the processor may determine whether the connector member and the sensor unit are in a contact state. In an embodiment, the sensor unit may include a first contact terminal and a second contact terminal. When the connector member is in contact with both the first contact terminal and the second contact terminal, the processor may determine that the connector member is in contact with the sensor unit.

In operation 9200, the processor may determine whether the connector member and the sensor unit are in a non-contact state on the basis of a signal received from the sensor unit. Specifically, the connector member, which has been in contact with both the first contact terminal and the second contact terminal, may be released from the contact with the second contact terminal while moving along the longitudinal direction of the storage unit. At this time, the processor may receive the non-contact detection signal from the sensor unit. When the processor receives the non-contact detection signal from the sensor unit, the processor may proceed to operation 9300.

In operation 9300, the processor may count the non-contact detection signal received for a predetermined period of time after initially receiving the non-contact detection signal from the sensor unit.

In operation 9410, the processor may increase a count value by one.

In an embodiment, whenever the non-contact detection signal is counted regardless of whether the medical liquid is discharged from the storage unit, the processor may increase the count value by one.

In another embodiment, whenever the medical liquid is discharged from the storage unit, the processor may receive the non-contact detection signal, and may count the number of receptions of the non-contact detection signal and increase the count value by one.

In operation 9420, when the count value is greater than or equal to a preset value, the processor may determine a remaining amount value of the storage unit. For example, the preset value for the count value may be 10 times, 15 times, 20 times, or the like, but the present disclosure is not limited thereto.

In an embodiment, when the count value is greater than or equal to the preset value, the processor may determine the remaining amount value of the storage unit as a preset remaining amount value. For example, the preset remaining amount value may be 75%, 50%, 25%, 10%, or the like of the total capacity of the storage unit, but the present disclosure is not limited thereto.

In another embodiment, when the count value is greater than or equal to the preset value, the processor may calculate the remaining amount value of the storage unit on the basis of a discharge amount when the medical liquid is discharged once and a count value. For example, when the remaining amount of the storage unit at the time of initially receiving the non-contact detection signal from the sensor unit is 40 unit, the discharge amount when the medical liquid is discharged once is 1 unit, and the count value is 10 times, the processor may determine the remaining amount of the storage unit as 30 unit (=40 unit–(1 unit*10 times)).

Meanwhile, referring to operation 9210, when the processor receives the contact detection signal from the sensor unit before the count value becomes greater than or equal to the preset value, the processor may determine that noise has occurred and reset the count value.

The contact between the connector member and the sensor unit may be temporarily generated or released due to various causes even when there is no change in the remaining amount of the medical liquid while using the medical liquid injection device. In the present disclosure, in order to minimize an information error on the remaining amount of the medical liquid due to such noise in addition to the change in the remaining amount of the medical liquid in detecting the remaining amount of the medical liquid, whether a non-contact monitoring signal is received may be continuously checked even after the non-contact detection signal is initially received between the connector member and the sensor unit. In the present disclosure, only when the continuous count value of the non-contact detection signal becomes greater than or equal to the preset value, it is determined that the non-contact has occurred between the connector member and the sensor unit due to a change in the remaining amount of the medical liquid, and the remaining amount value of the storage unit may be determined as the preset remaining amount value.

In addition, in the present disclosure, the remaining amount value of the storage unit is calculated on the basis of a remaining amount value of the storage unit when the non-contact detection signal is initially received, a discharge amount when the medical liquid is discharged once, and a count value of the non-contact detection signal in consideration of the situation in which the medical liquid is discharged in a process of counting the non-contact detection signal after the non-contact detection signal is initially received, thereby more accurately determining the remaining amount value of the storage unit.

Figure 24:
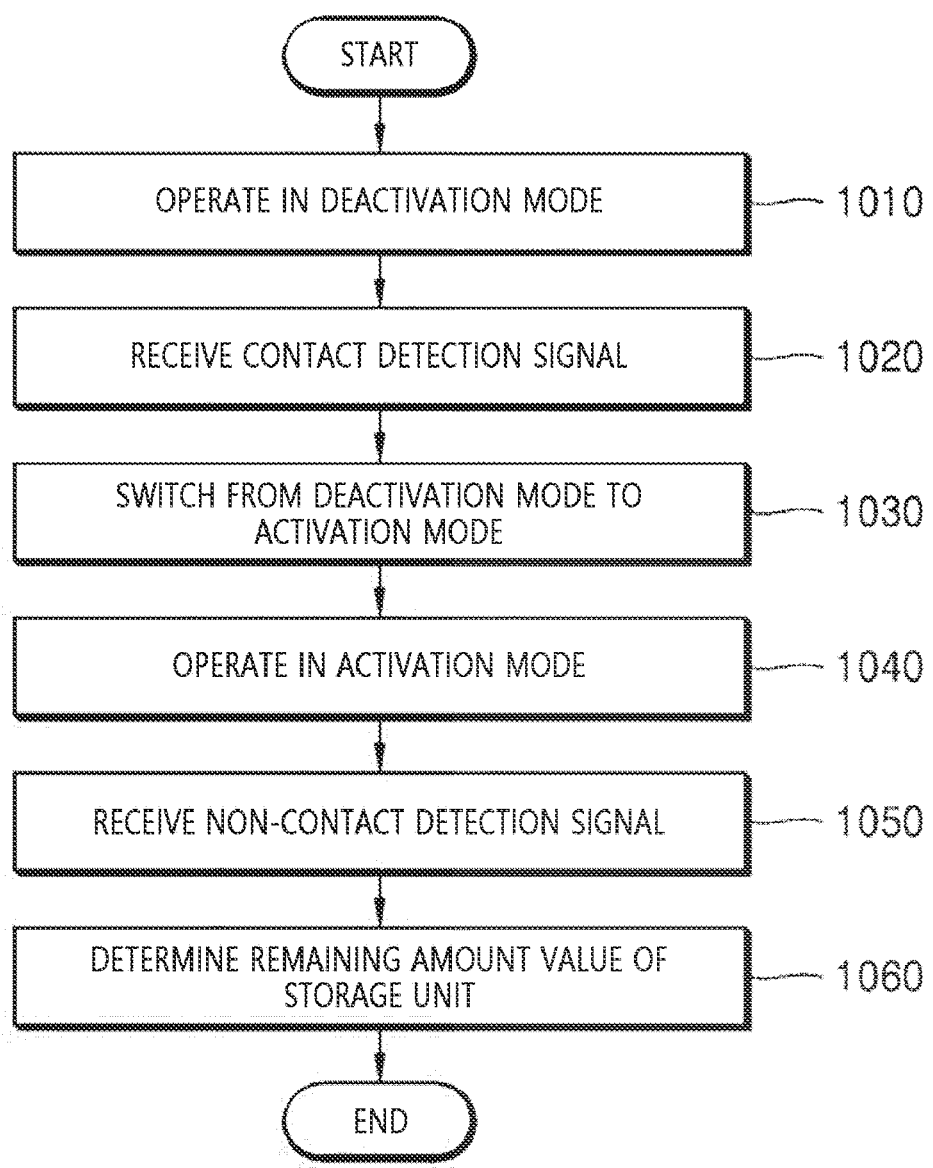
FIG. 24 is a flowchart illustrating a method of controlling a medical liquid injection device in response to receiving a signal from a sensor unit according to an embodiment.

FIG. 24 is a flowchart illustrating a method of controlling a medical liquid injection device in response to receiving a signal from a sensor unit according to an embodiment.

The medical liquid injection device may include a storage unit, a plunger, a connector member, a processor, and a sensor unit. A medical liquid may be stored in the storage unit. The plunger may seal the storage unit, and may move along a longitudinal direction of the storage unit as a medical liquid is replenished in the storage unit or discharged from the storage unit. The connector member may be attached to one side of the plunger. The processor may receive a contact detection signal or a non-contact detection signal from the sensor unit disposed adjacent to the storage unit. The connector member may be in contact with or not in contact with the sensor unit while moving together with the plunger.

Referring to FIG. 24, in operation 1010, the medical liquid injection device may operate in a deactivation mode. In the deactivation mode of the medical liquid injection device, power may not be supplied to at least some components inside the medical liquid injection device. In an activation mode of the medical liquid injection device, power may be supplied to the components to which the power is not supplied in the deactivation mode. Specifically, in the deactivation mode, power may not be supplied to a driving unit of the medical liquid injection device. In order to discharge the medical liquid stored in the storage unit, a driving force of the driving unit is required, and in the deactivation mode, since power is not supplied to the driving unit, the medical liquid stored in the storage unit is not injected to the user.

In the deactivation mode of the medical liquid injection device, the connector member and the sensor unit may be in a non-contact state. In an embodiment, the sensor unit may include a first contact terminal and a second contact terminal. When the connector member is in contact with only the second contact terminal and is not in contact with the first contact terminal, the processor may determine that the connector member and the sensor unit are in non-contact with each other.

In operation 1020, the processor may receive the contact detection signal from the sensor unit. Specifically, the connector member in contact with only the second contact terminal may come into contact with both the first contact terminal and the second contact terminal while moving along the longitudinal direction of the storage unit. At this time, the processor may receive the contact detection signal from the sensor unit.

In operation 1030, the processor may switch the mode of the medical liquid injection device from the deactivation mode to the activation mode. When the connector member is in contact with only the first contact terminal, the medical liquid injection device operates in the deactivation mode, and when the connector member is in contact with both the first contact terminal and the second contact terminal, the medical liquid injection device may operate in the activation mode.

In an embodiment, the processor may count a contact detection signal received for a predetermined period of time after initially receiving the contact detection signal from the sensor unit, and switch the mode of the medical liquid injection device from the deactivation mode to the activation mode when the count value is greater than or equal to a preset value. Meanwhile, when the processor receives the non-contact detection signal from the sensor unit before the count value becomes greater than or equal to the preset value, the processor may determine that noise has occurred and reset the count value.

In an embodiment, after the medical liquid injection device is switched from the deactivation mode to the activation mode, the above-described operations may not be repeatedly performed.

In operation 1040, the medical liquid injection device may operate in the activation mode. In the activation mode of the medical liquid injection device, power may be supplied to the components to which the power is not supplied in the deactivation mode. Specifically, in the activation mode, power is supplied to the driving unit of the medical liquid injection device, and thus the medical liquid stored in the storage unit may be injected to the user.

In operation 1050, the processor may receive the non-contact detection signal from the sensor unit. Specifically, the connector member, which has been in contact with both the first contact terminal and the second contact terminal, may be released from the contact with the second contact terminal while moving along the longitudinal direction of the storage unit. At this time, the processor may receive the non-contact detection signal from the sensor unit.

Meanwhile, in an embodiment, operation 1050 is performed only when the medical liquid injection device operates in the activation mode, and operation 1050 may not be performed when the medical liquid injection device operates in the deactivation mode.

In operation 1060, the processor may determine a remaining amount value of the storage unit.

In an embodiment, when the non-contact detection signal is received from the sensor unit, the processor may determine the remaining amount value of the storage unit as a preset remaining amount value.

In an embodiment, the processor may count the non-contact detection signal received for a predetermined period of time after initially receiving the non-contact detection signal from the sensor unit, and determine the remaining amount value of the storage unit as the preset remaining amount value when the count value is greater than or equal to a preset value.

In an embodiment, after the non-contact detection signal is initially received from the sensor unit, the processor may count the number of receptions of the non-contact detection signal by receiving the non-contact detection signal each time the medical liquid is discharged from the storage unit, and when the count value is greater than or equal to the preset value, the remaining amount value of the storage unit may be determined as the preset remaining amount value.

In an embodiment, the processor may count the number of receptions of the non-contact detection signal by receiving the non-contact detection signal each time the medical liquid is discharged from the storage unit, after the non-contact detection signal is initially received from the sensor unit. In addition, the processor may calculate the remaining amount value of the storage unit on the basis of a remaining amount value of the storage unit when the non-contact detection signal is initially received, a discharge amount when the medical liquid is discharged once, and a count value.

Meanwhile, when the processor receives the contact detection signal from the sensor unit before the count value becomes greater than or equal to the preset value, the processor may determine that noise has occurred and reset the count value.

Various embodiments of the present disclosure may be implemented as software (e.g., a program) including one or more instructions that are stored in a storage medium that is readable by a machine. For example, a processor of the machine may invoke at least one of the one or more instructions stored in the storage medium, and execute the at least one instruction. This allows the machine to be operated to perform at least one function according to the at least one instruction invoked. The one or more instructions may include a code generated or executed by a compiler or an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. When distributed online, at least a part of the computer program product may be temporarily generated or at least temporarily stored in the machine-readable storage medium, such as a memory of the manufacturer's server, a server of the application store, or a relay server.

In addition, in the present specification, a "unit" may be a hardware component such as a processor or a circuit, and/or a software component executed by a hardware component such as a processor.

The scope of the present embodiment will be defined by the following claims rather than the above-detailed description, and all changes and modifications derived from the meaning and the scope of the claims and equivalents thereof should be understood as being included in the scope of the present embodiment.

What is claimed is:

1. A drug injection device comprising:
    a storage part in which a drug is stored
    a plunger configured to seal the storage part, and move in a longitudinal direction of the storage part as the drug is refilled into or discharged from the storage part;
    a connector member attached to one side of the plunger;
    a sensor unit positioned adjacent to the storage part and including a plurality of contact terminals; and
    a processor configured to receive a contact detection signal or a non-contact detection signal from the sensor unit,
    wherein the connector member moves together with the plunger and comes into contact with or is spaced apart from at least one of the plurality of contact terminals of the sensor unit, and
    the processor is further configured to, after first receiving the non-contact detection signal, count a number of times the non-contact detection signal is received during a predetermined period and, when a count value is greater than or equal to a preset value, to determine a remaining amount value of the drug in the storage part based on the count value and one of the plurality of contact terminals, from which the non-contact detection signal is received.

2. The drug injection device of claim 1, wherein the processor is further configured to switch a mode of the drug injection device from an inactive mode to an active mode when the contact detection signal is received from the sensor unit.

3. The drug injection device of claim 1, wherein the processor is further configured to, when receiving the non-contact detection signal from the sensor unit, determine the remaining amount value of the drug in the storage part as a preset remaining amount value.

4. The drug injection device of claim 1, wherein the processor is further configured to, after first receiving the non-contact detection signal from the sensor unit, count the number of times the non-contact detection signal is received each time the drug is discharged from the storage part by receiving the non-contact detection signal, and to determine the remaining amount value of the drug in the storage part as a preset remaining amount value when the count value is greater than or equal to the preset value.

5. The drug injection device of claim 4, wherein the processor is further configured to calculate the remaining amount value of the drug in the storage part based on a remaining amount value of the drug in the storage part at a time of first receiving the non-contact detection signal, a discharge amount per drug discharge, and the count value.

6. The drug injection device of claim 1, wherein the processor is further configured to, after first receiving the contact detection signal from the sensor unit, count the number of times the contact detection signal is received during the predetermined period, and to switch a mode of the drug injection device from an inactive mode to an active mode when the count value is greater than or equal to the preset value.

7. The drug injection device of claim 6, wherein the processor is further configured to, when the contact detection signal or the non-contact detection signal is received from the sensor unit before the count value reaches the preset value, determine that a noise has occurred and reset the count value.

* * * * *